(12) United States Patent
Bronder

(10) Patent No.: US 7,304,643 B2
(45) Date of Patent: *Dec. 4, 2007

(54) SPIRAL CONSTRUCTION OF A GEODESIC DOME

(75) Inventor: Matthew L. Bronder, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/234,682

(22) Filed: Sep. 23, 2005

(65) Prior Publication Data
US 2006/0022977 A1 Feb. 2, 2006

Related U.S. Application Data

(63) Continuation of application No. 10/377,981, filed on Feb. 28, 2003, now Pat. No. 7,034,826.

(51) Int. Cl.
*G06T 17/00* (2006.01)

(52) U.S. Cl. ...................................... 345/423

(58) Field of Classification Search ............... None
See application file for complete search history.

(56) References Cited

U.S. PATENT DOCUMENTS

| 4,901,483 | A | 2/1990 | Huegy | 52/81.2 |
|---|---|---|---|---|
| 6,295,785 | B1 | 10/2001 | Hermann | 52/745.08 |
| 6,429,865 | B1 | 8/2002 | Marshall | 345/420 |
| 2004/0075659 | A1 | 4/2004 | Taubin | 345/428 |

OTHER PUBLICATIONS

Foley et al., *Computer Graphics: Principles and Practice.* Addison-Wesley Pub. Co., Inc. 1997. pp. 473-475.
Holden, Alan. *Shapes, Space, and Symmetry.* New York: © Columbia University Press, 1971.
Wenninger, Magus J. *Spherical Models.* New York: © Cambridge University Press 1979.
Zimmerman, Uwe. *Geodesic Shape Generator for Persistence of Vision 3.1x.* Version 2.0. Jul. 1999.
POV-Ray 3.5 Documentation. Dec. 5, 2002. <http://web.archive.org/web/20021203212020/www.povray.org/documentation/view/174/>.

*Primary Examiner*—Ulka Chauhan
*Assistant Examiner*—Peter-Anthony Pappas

(57) ABSTRACT

Four predefined vertices define an icosahedron used for constructing a geodesic dome. Each section of the icosahedron, including the top, center, and bottom, is sequentially processed to construct a plurality of vertices and a plurality of indices of triangles on the surface of the geodesic dome. One of the inputs defines the order of the geodesic dome, which determines the number of vertices. A plurality of transformation matrices are employed to rotate a three-dimensional vector about a selected axis through a predefined angle to generate the vertices. The indices for the triangles are constructed as either triangle strips or triangle lists, for each of the three sections of the icosahedron. Vertices are stored in a vertex buffer and indices in an index buffer. The vertices are selected to form a plurality of edges disposed at an equal distance from the center of the icosahedron.

29 Claims, 17 Drawing Sheets

GEODESIC DOME

GOURAUD SHADED SPHERE

SPIRAL CONSTRUCTION OF A GEODESIC DOME

RELATED APPLICATIONS

This application is a continuation of prior patent application Ser. No. 10/377,981, filed on Feb. 28, 2003, now U.S. Pat. No. 7,034,826 the benefit of the filing date of which is hereby claimed under 35 U.S.C. 120.

FIELD OF THE INVENTION

The present invention generally pertains to a method and system for modeling spherical geometry, and more specifically, for modeling a geodesic dome through a single pass, iterative process of subdividing a polyhedron into the geodesic dome of arbitrary tessellation order, generating vertices and corresponding triangle index data for a specific polyhedron, such as an icosahedron.

BACKGROUND OF THE INVENTION

A sphere is one of the fundamental graphic primitive shapes employed in three-dimensional (3-D) computer graphics that are commonly used in computer games, simulations, and other types of virtual environments. Although dramatic advances have recently been made in developing powerful graphics hardware and engines to render 3-D computer graphics in realtime, new approaches that reduce the processing overhead required for generating primitive shapes such as spheres are very much desired, so that the available processing capabilities of the central processing unit (CPU) and graphics processors can be more efficiently employed for other purposes. The geometry of spheres and other primitive shapes is either directly expressed as a collection of triangles, or through the control points of a higher order surface, which must itself be tessellated into triangles by the rendering engine early in the graphics pipeline processing. Accordingly, a sphere is normally approximated by a set of triangles with shared edges and, ideally, having vertices evenly distributed over the surface of the sphere. One of the geometric forms best suited to the approximation of a sphere using polygons is a geodesic dome, as shown in FIG. 2A. The geodesic dome shown in this Figure is constructed from a subdivided icosahedron and has 252 vertices that define the corners of 500 triangles. When rendered using diffuse light with Gouraud shading, the result is shown in FIG. 2B. To construct a geodesic dome like that shown in FIG. 2A from one of the regular polyhedra, polygons comprising the base geometry of any of the five Platonic solids are reiteratively subdivided in a triangulation process. Each of the polygons in the polyhedron are subdivided into a number of small polygons, and the resulting vertices of the polygons are projected out to a radius equal to that of the polyhedron's original vertices. The smaller polygons are subdivided again, and the process is reiterated until the resulting geometry satisfactorily approximates a sphere for the purposes of the graphic application in which the sphere is to be used. Thus, this reiterative process creates n geodesic domes of various complexities to arrive at a final dome of order n, applying the geodesation operation on each intermediate dome in turn, to achieve greater tessellation.

Although the process described above is straightforward and effective, it has its drawbacks. By its nature, this process lends itself to the use of recursive functions calls, which have a clear inherent processing cost, due to increased call overhead, additional storage requirements for function state, and the repetitive nature of the method. This prior art process must construct intermediate geodesic domes during each successive pass to subdivide the polygons comprising each intermediate dome. Accordingly, a substantial up-front memory allocation must be made to store all of the intermediate geodesic domes, or memory must be allocated at every reiterative pass, or a very high frequency of smaller memory allocations and memory freeing operations must be performed at the polygon level to divide individual triangles of the intermediate domes. The single allocation and per-pass allocation of memory reserve much more memory that is actually required to construct the final geodesic dome. The per-triangle allocations of memory are much better at conserving memory, but they sacrifice performance and cause memory fragmentation. Also, the multi-pass approach for generating a geodesic dome is computationally show, not only because it must generate successive intermediate geodesic domes, but also because the per-triangle subdivisions can lead to redundant calculation of vertex locations for subdivided triangles, where a calculated vertex location along the edge of one triangle might be recalculated for an adjacent triangle that shares the edge.

To avoid the problems noted above, the geometry of the desired geodesic dome can be pre-computed and then loaded for rendering by a graphics engine when needed. However, in many applications, it will not be possible to pre-compute the required geometry for a geodesic dome. In addition, the storage requirements for a densely modeled sphere can be relatively significant. For example, a geodesic dome formed from an icosahedron with a tessellation order of 64 contains over 40,000 vertices and 490,000 indices. By generating a sphere at runtime instead of pre-computing it, the storage of the pre-computed geometry data is avoided. Instead, it is only necessary to store the origin, radius, and tessellation order of the sphere as input to the sphere generation process. Additionally, to provide a performance enhancement, there is a clear need for an approach that enables the spherical geometry to be computed in less time than required for loading the equivalent amount of pre-computed geometry data for the sphere from a file.

To avoid recursive or multi-pass subdivisions of a geodesic dome, a simpler method of subdivision can be employed, so that the repositioning of polygons between each subdivision is postponed, and by performing the polygon subdivision and vertex projections as discrete steps. Each polygon of a polyhedron is first completely subdivided into a final set of smaller polygons that will form the geodesic dome. After the subdivisions, all polygons have the same edge lengths and lie completely within the planes of the original polyhedral faces. The vertices of these polygons are then gnomonically projected en masse to a distance from the center of the polyhedron equal to that of the original vertices. Thus, this iterative approach is much faster than performing successive subdivisions of intermediate geodesic domes and simplifies the entire process for non-power-of-two tessellation orders. However, in postponing the gnomonic projections of polygons until after all subdivisions have taken place, this approach sacrifices the uniformity of vertex distribution on the surface of the geodesic dome. Instead, the uniformity of distribution lies on the surface of the original polyhedron and is lost during the projection process. Vertices located nearer to the corners of the original polyhedron will end up closer to one another in the resulting dome than those located close to the center of the original faces. Since the geodesic dome produced will less closely resemble a sphere than that which could have been constructed through the more conventional recursive process, additional vertices must be added with a higher tessellation order to compensate for the uneven distribution of vertices. For this reason, a still different approach is required that achieves equal distribution of vertices, but enables a polyhedron to be efficiently subdivided in a single pass, without the need to construct intermediate geodesic domes.

SUMMARY OF THE INVENTION

The present invention avoids the shortcomings of the above-noted prior art strategies for generating a geodesic dome by providing a highly efficient method for subdividing a polyhedron in a single pass for any given tessellation order, while still providing a good approximation to a sphere. As has been known since the time of the ancient Greeks, there are five regular polyhedra, including the tetrahedron, the cube, the octahedron, the dodecahedron, and the icosahedron. A regular polyhedron is one that that is both equilateral and equiangular, i.e., a polyhedron in which all its faces are equal regular polygons, and in which the same number of faces meet at every vertex. In carrying out the present invention, a preferred embodiment employs an icosahedron as the base polyhedron to subdivide since, of the five regular polyhedra, it provides the most uniform distribution of vertices across the surface of the sphere when subdivided into a geodesic dome (only four vertices and three edges of the icosahedron are actually required by the invention). However, it will be understood that other regular polyhedra can instead be employed.

The present invention is able to perform single up-front memory allocations of exactly the right size for the vertex and index data generated for a geodesic dome. With memory requirements known from the start, the present invention does not need to reserve any memory above that required for storing the final geometry. Because the present invention is able to perform a single pass to generate a geodesic dome, regardless of the tessellation order required it also runs much faster than prior art recursive solutions. Indeed, the performance delta between the prior art and the present invention increases with the order specified. The speed of the present invention is not much worse than that of the simple "fully subdivide and then fully project" method of constructing a geodesic dome, but unlike that method, the present invention does not suffer a distribution penalty. The vertices of the geodesic dome produced by the present invention are distributed as uniformly as that of a dome produced through a more conventional recursive approach. Further, the geodesation pass of the present invention is performed in such a way as to generate the geometry in a spiral arrangement from one end of the dome to the other. Accordingly, it is a simple matter to modify the method to create a hemi or partial sphere by simply terminating the pass at a mid or other selected point, or by rendering a smaller number of triangles from a geometry list.

Another virtue of the present invention is that it is well suited to the formation of the dome geometry using a triangle strip. A triangle strip is a rendering construct comprising a series of triangles, where all but the first in the series is defined, in large part, by the previous triangle of the sequence. The first triangle is specified using three vertices, but all others are specified with a single vertex, using the vertices of previous triangles to complete them and thereby forming a strip of triangles with shared edges. Arranging the geometry in this manner not only saves on the bandwidth required to send the geometry to a graphics processing unit (GPU), but also imposes structural cohesion on the geometry for a post transform cache. The use of a triangle strip guarantees that two vertices will already be present in the post transform cache for all but the first triangle in the triangle strip, effectively yielding a triangle for every vertex.

A method for generating at least a part of a geodesic dome for use in a graphic environment in accord with the present invention provides for initially defining a base geometry of a polyhedron that will be tessellated to produce a geodesic dome. The base geometry includes a plurality of vertices of the polyhedron that are disposed at selected location on the polyhedron. The polyhedron has a plurality of faces, each face comprising a polygon. The plurality of faces of the polyhedron are derived from the base geometry. Vertices and indices for the plurality of triangles comprising different sections of the polyhedron are generated in this method by processing the plurality of triangles for successive faces of the polyhedron, and for successive portions of the polyhedron corresponding to the different sections of the polyhedron. The different sections include a top section, a middle section, and a bottom section. A triangle construct is then constructed using the vertices and indices. The vertices and indices for the triangle construct thus comprise geometric data that define the geodesic dome (or a desired portion thereof).

The step of defining the base geometry includes selecting the vertices so as to form a plurality of edges that are disposed at the same distance from a center of the polyhedron. To generate the vertices of the triangles, current coordinates for a dome vertex are multiplied by a radial dimension desired for the geodesic dome, at each of a plurality of different positions of the dome vertex. The dome vertex is determined as a function of the base geometry of the polyhedron.

A vertex buffer is allocated in memory to store the vertices, and an index buffer is allocated in memory to store the indices. When allocating memory for these buffers, the method determines the number of vertices and indices required for constructing the geodesic dome to a desired tessellation order. A plurality of parameters to control generating the geodesic dome can be input. These parameters include a radius of the geodesic dome, and a tessellation order of the geodesic dome. In addition, the input parameters can include a vertex size defining a stride of the vertices that define the geodesic dome. Optionally, a parameter that determines how much of the geodesic dome is to be generated can also be input.

The triangle construct includes either a triangle strip, which includes adjacent triangles running trough different sections of the polyhedron, or a triangle list of vertices and indices for triangles comprising the geodesic dome. An election can be made to use either the triangle strip or the triangle list for the triangle construct.

The method also provides computing (or pre-computing) a plurality of constants for use in generating at least part of the geodesic dome, including a plurality of transformation matrices employed to rotate a 3-D vector about a selected axis through a predefined angle, the base geometry of the polyhedron, and a dot product of any two adjacent vertices of any face of the polyhedron.

In one preferred form of the present invention, the polyhedron is an icosahedron. The step of defining the base geometry is carried out by defining four vertices, including first and fourth vertices that are disposed at opposite ends of the icosahedron, and second and third vertices that are disposed at other predefined corners of the icosahedron, intermediate to the ends thereof. Each of these four vertices is disposed at equal distances from a central origin of the icosahedron. If needed for a specific application of the present invention, e.g., for ease of applying lighting, surface normals for each triangle vertex of the plurality of the triangles that subdivide the plurality of faces of the polyhedron can optionally be computed.

A further aspect of the present invention is directed to a memory medium that stores machine instructions for carrying out the steps of the method described above. Yet another aspect of the invention is directed to a system that includes a memory in which machine instructions are stored, and a processor. The processor executes the machine instructions and carries out functions that are also generally consistent with the steps of this method.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 3A:
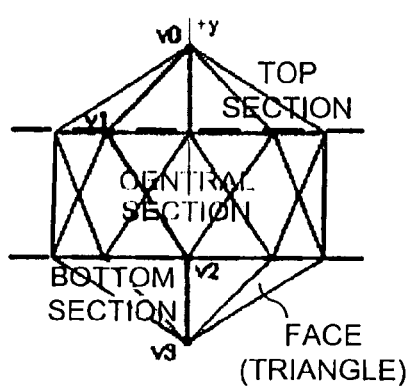
Figure 3B:
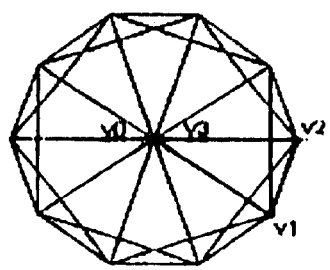
Figure 3C:
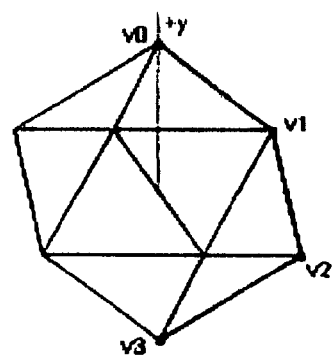
Figure 4:
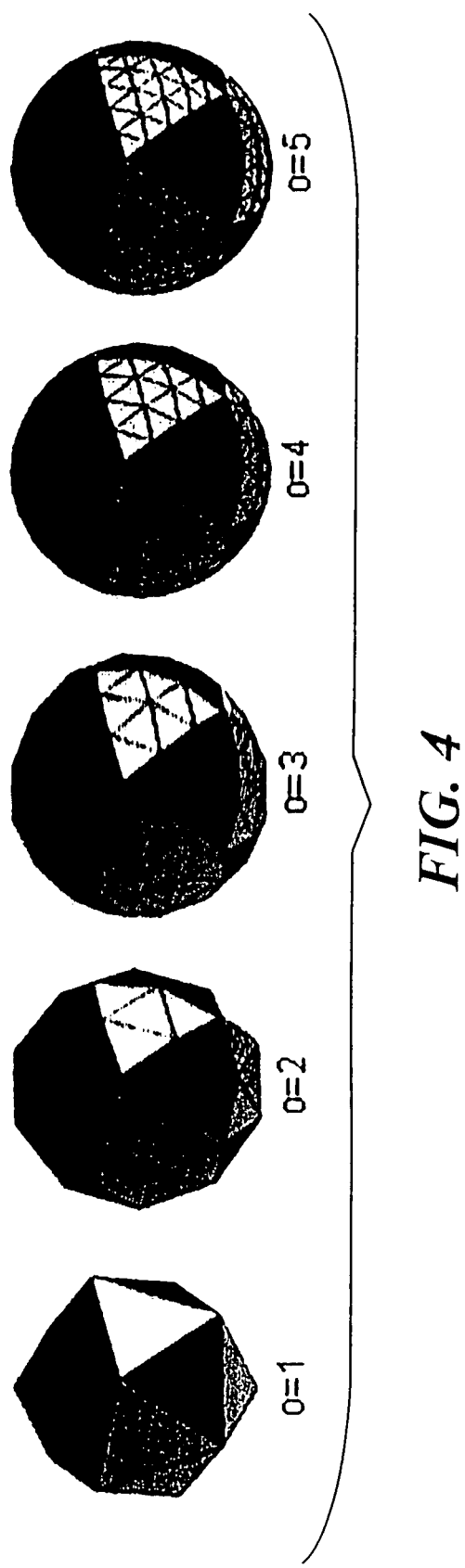
Figure 5:
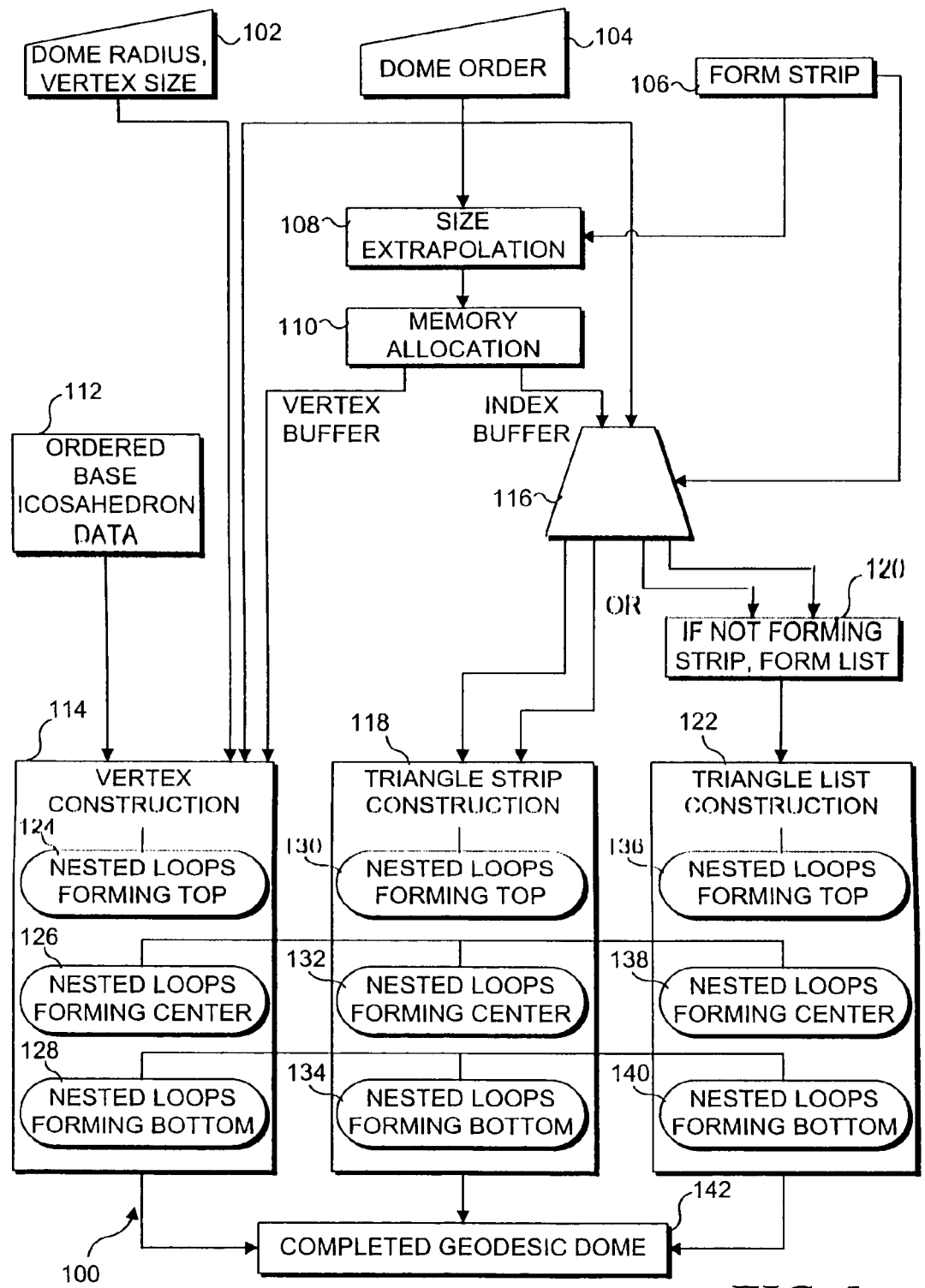
Figure 6:
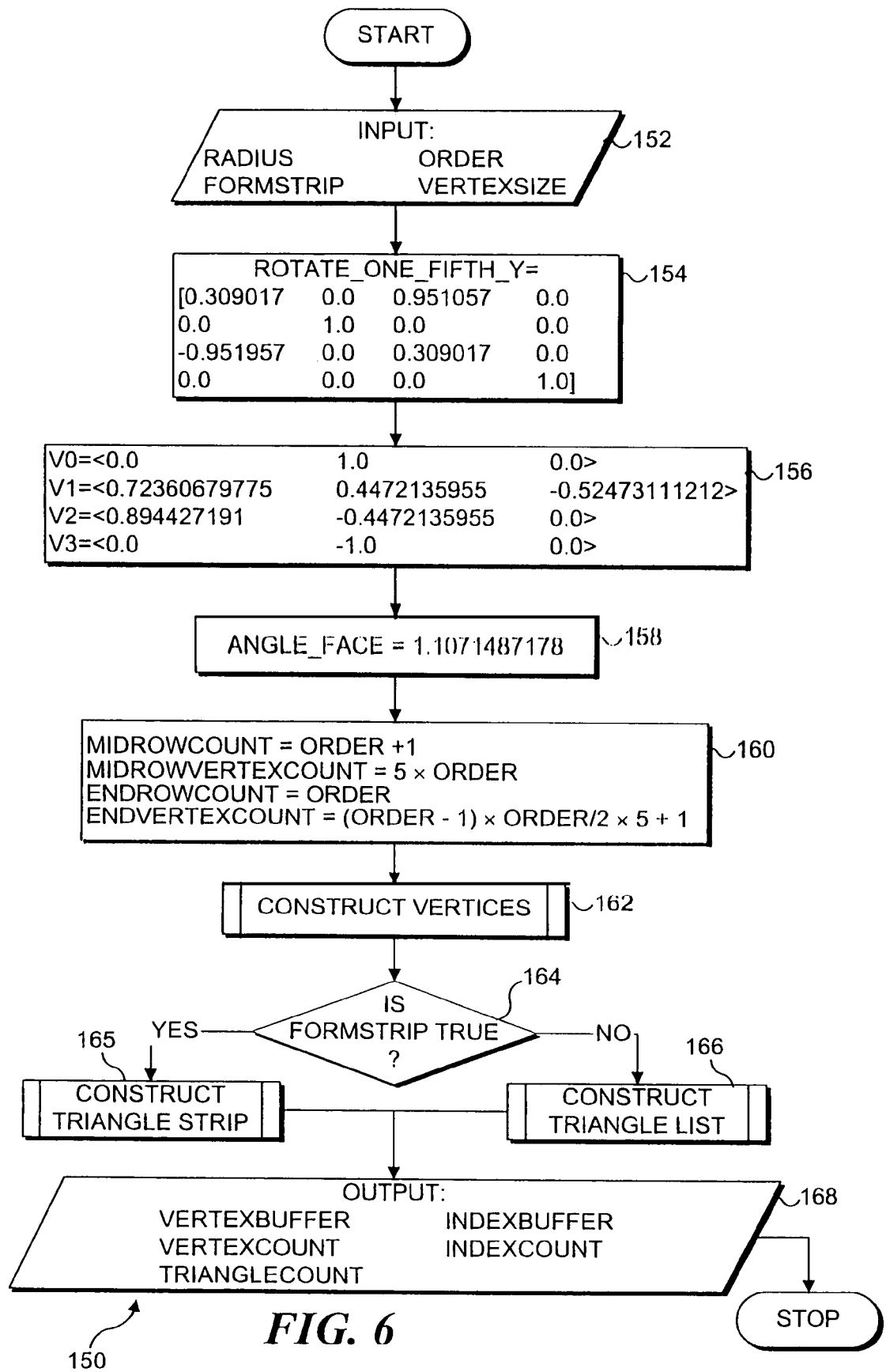
Figure 7:
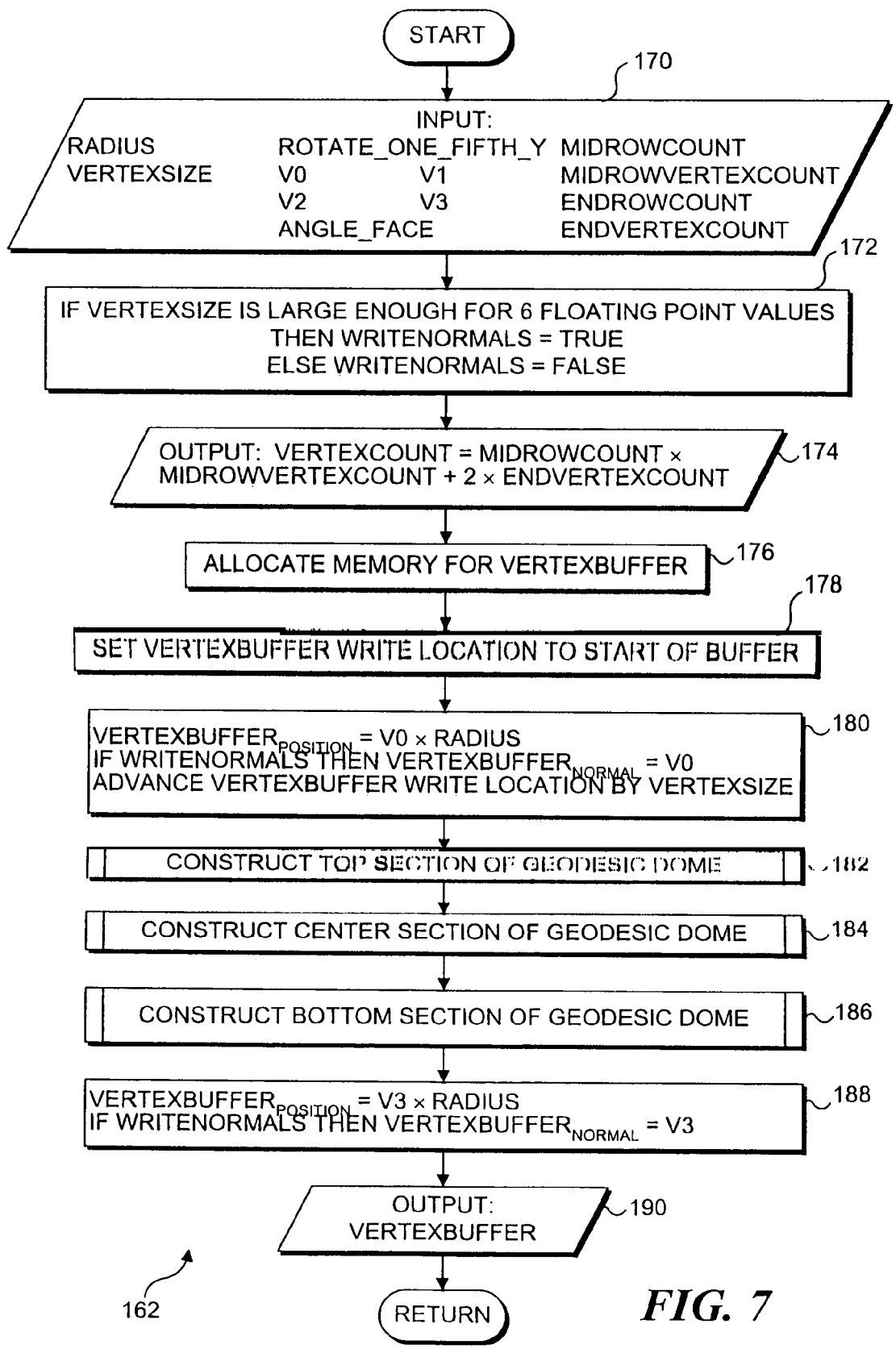
Figure 8:
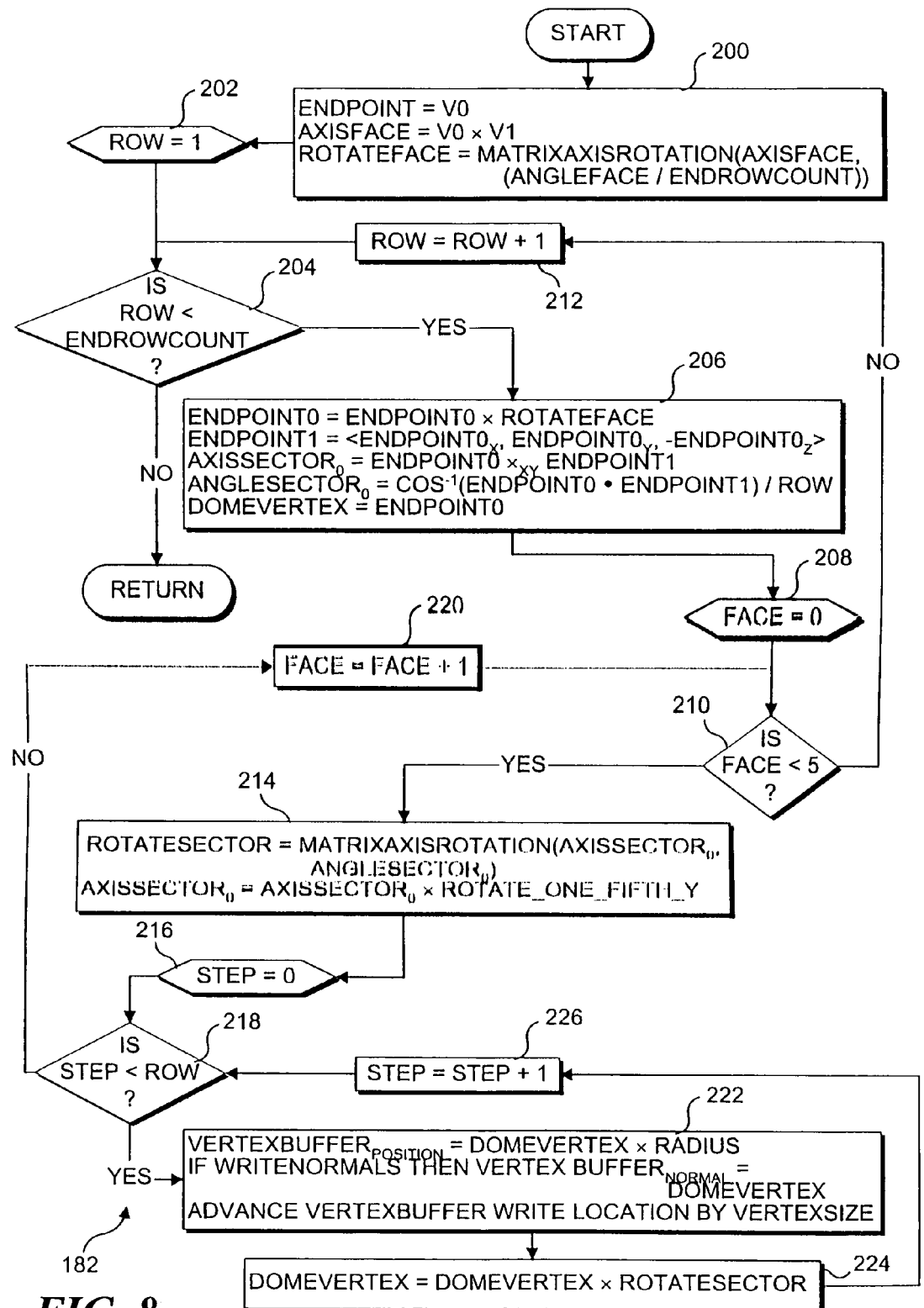
Figure 9:
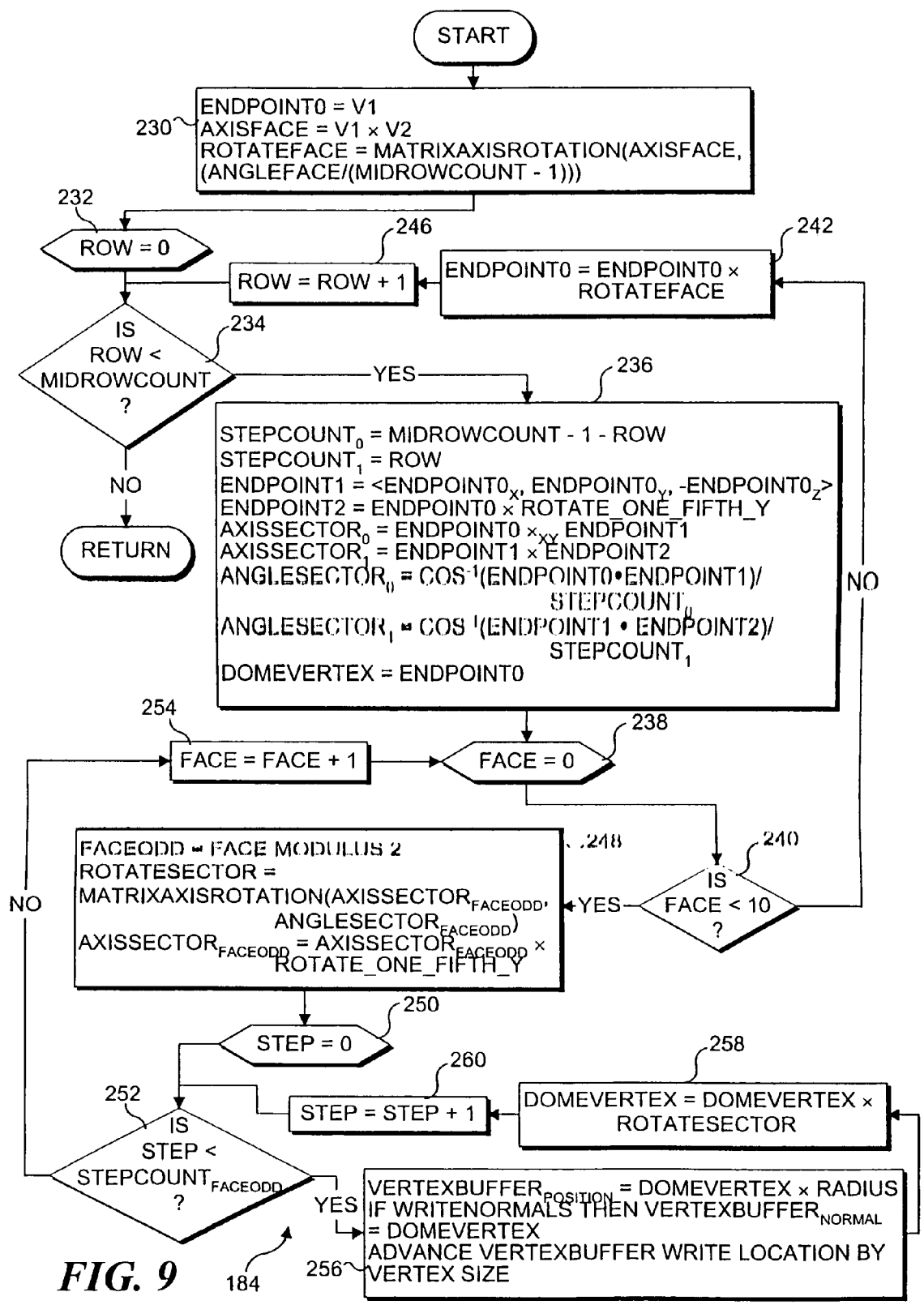
Figure 10:
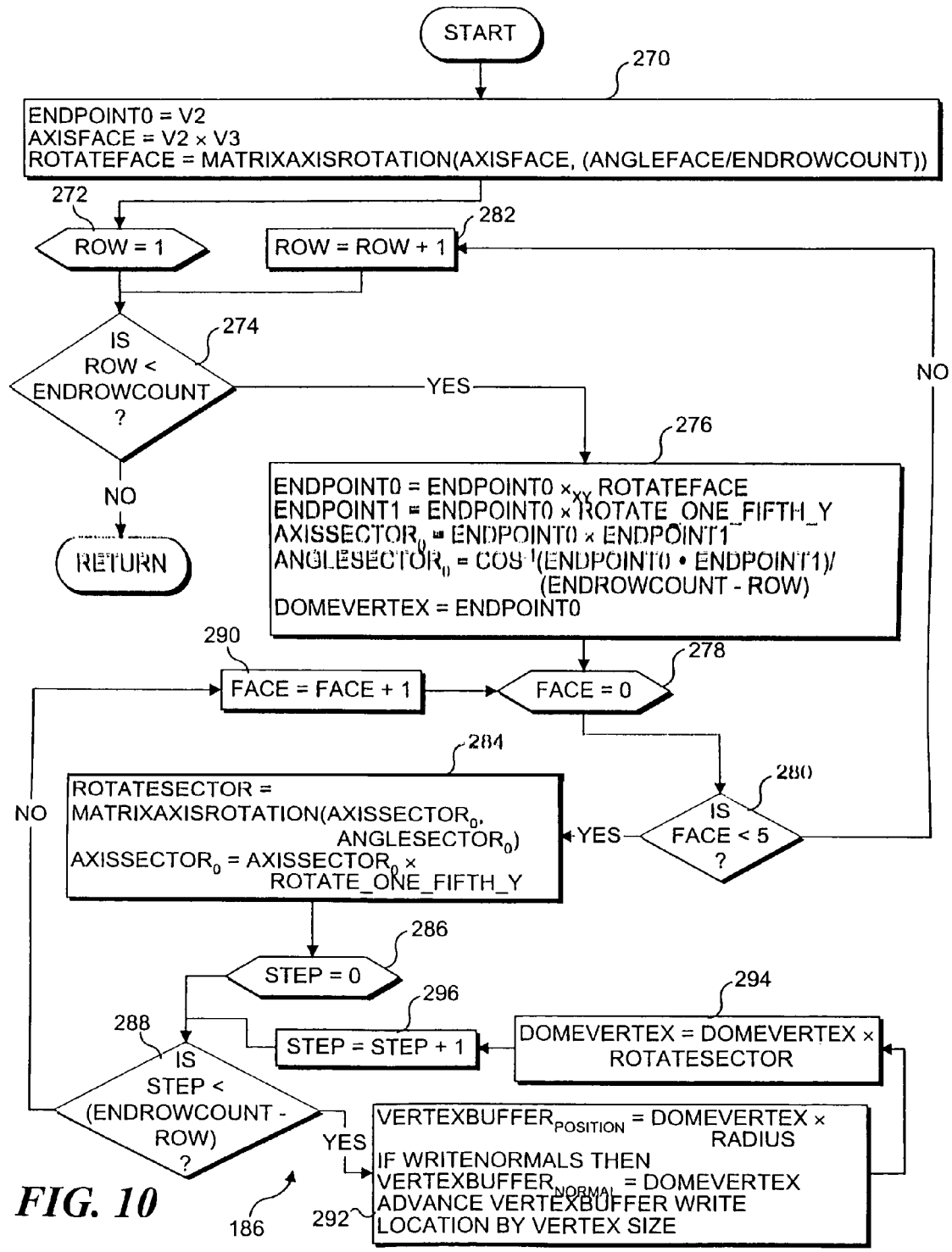
Figure 11:
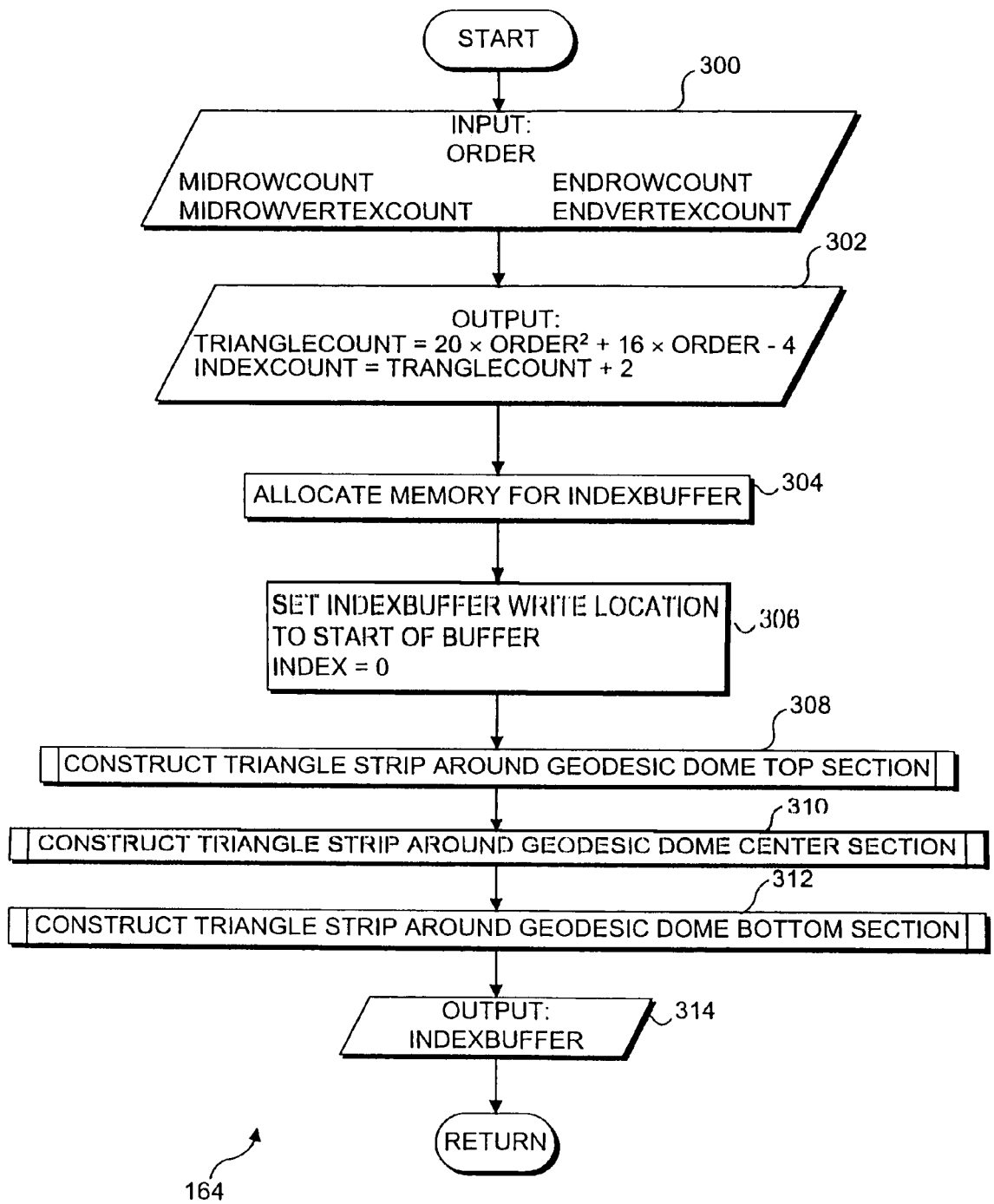
Figure 12:
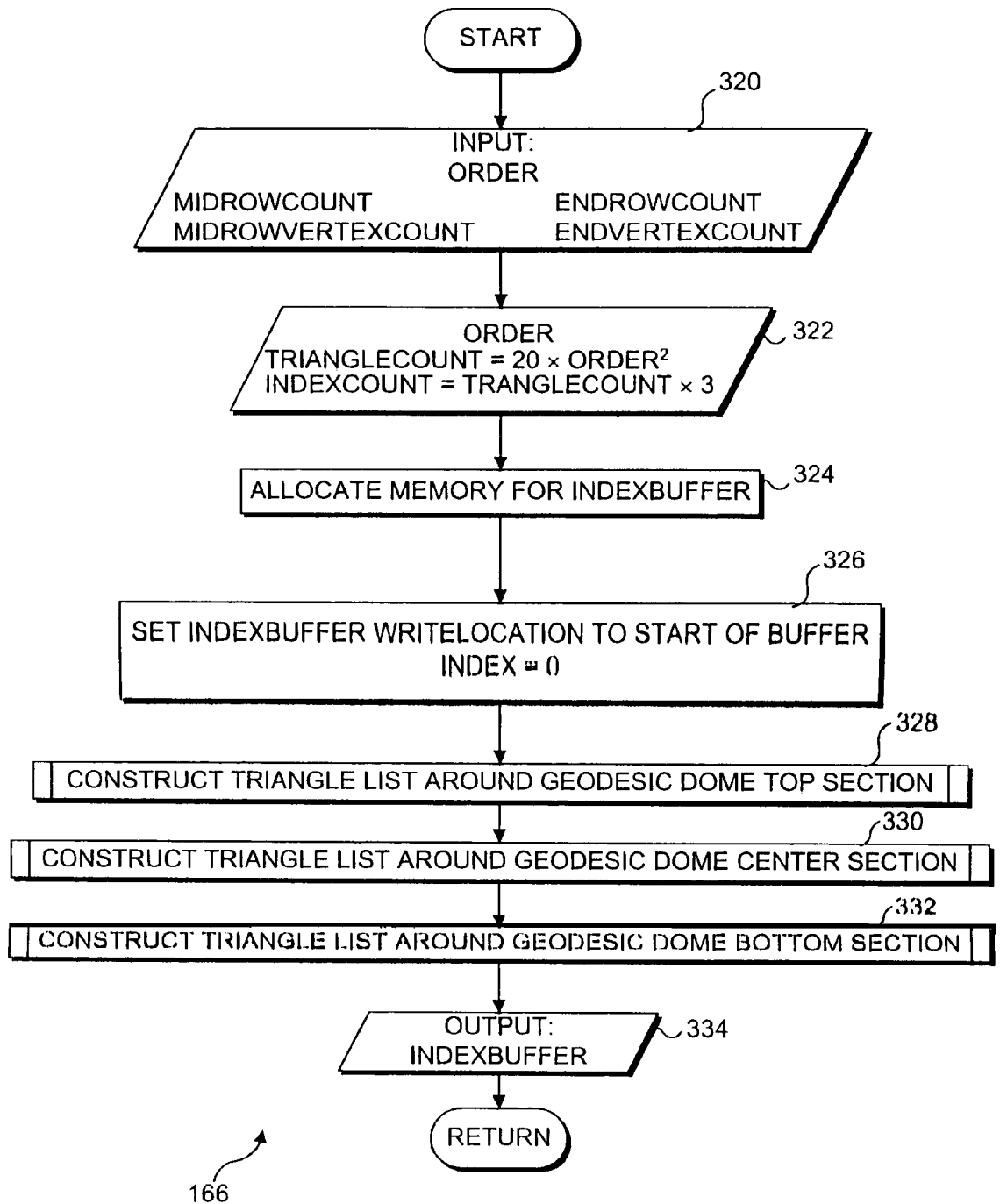
Figure 13:
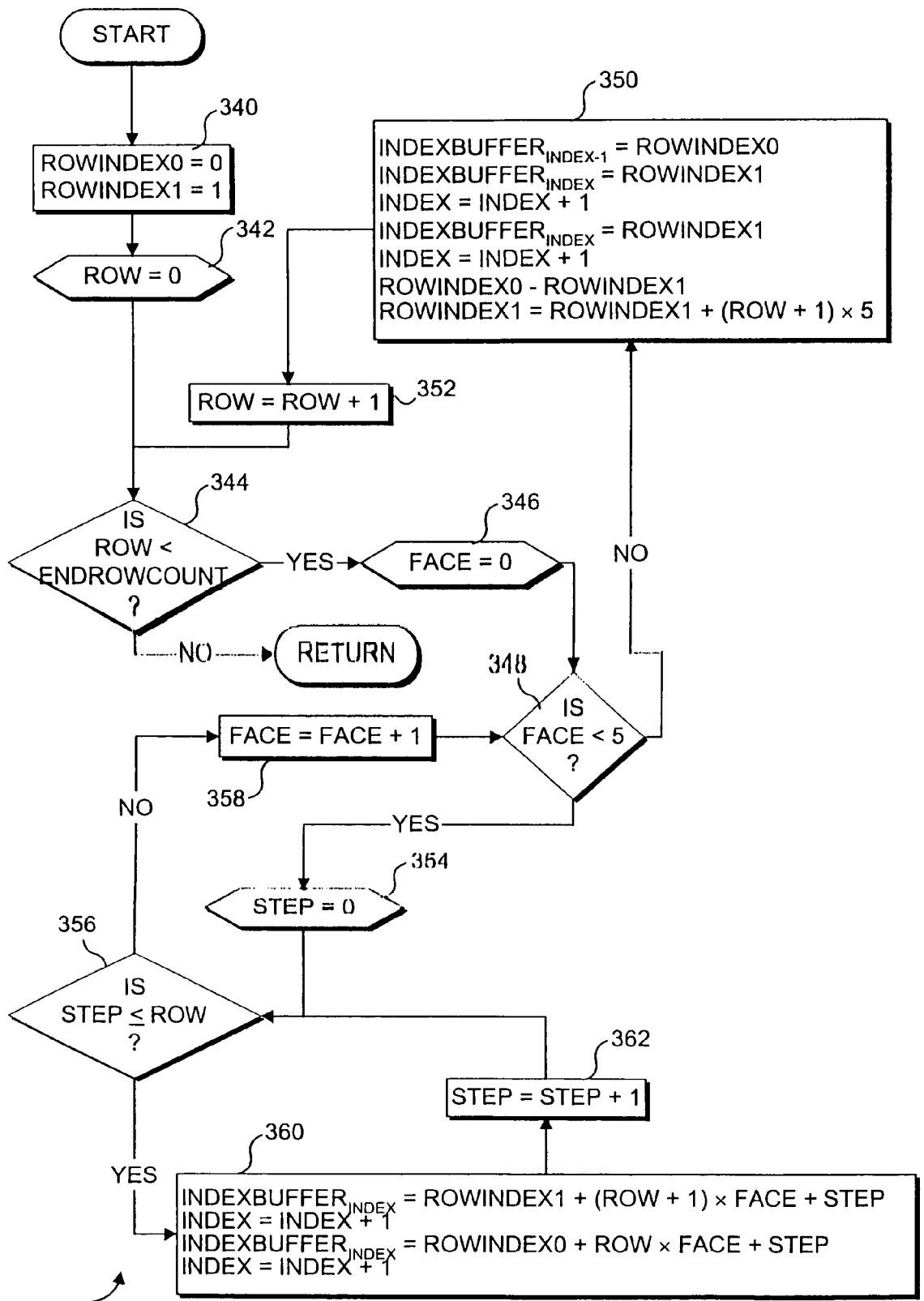
Figure 14:
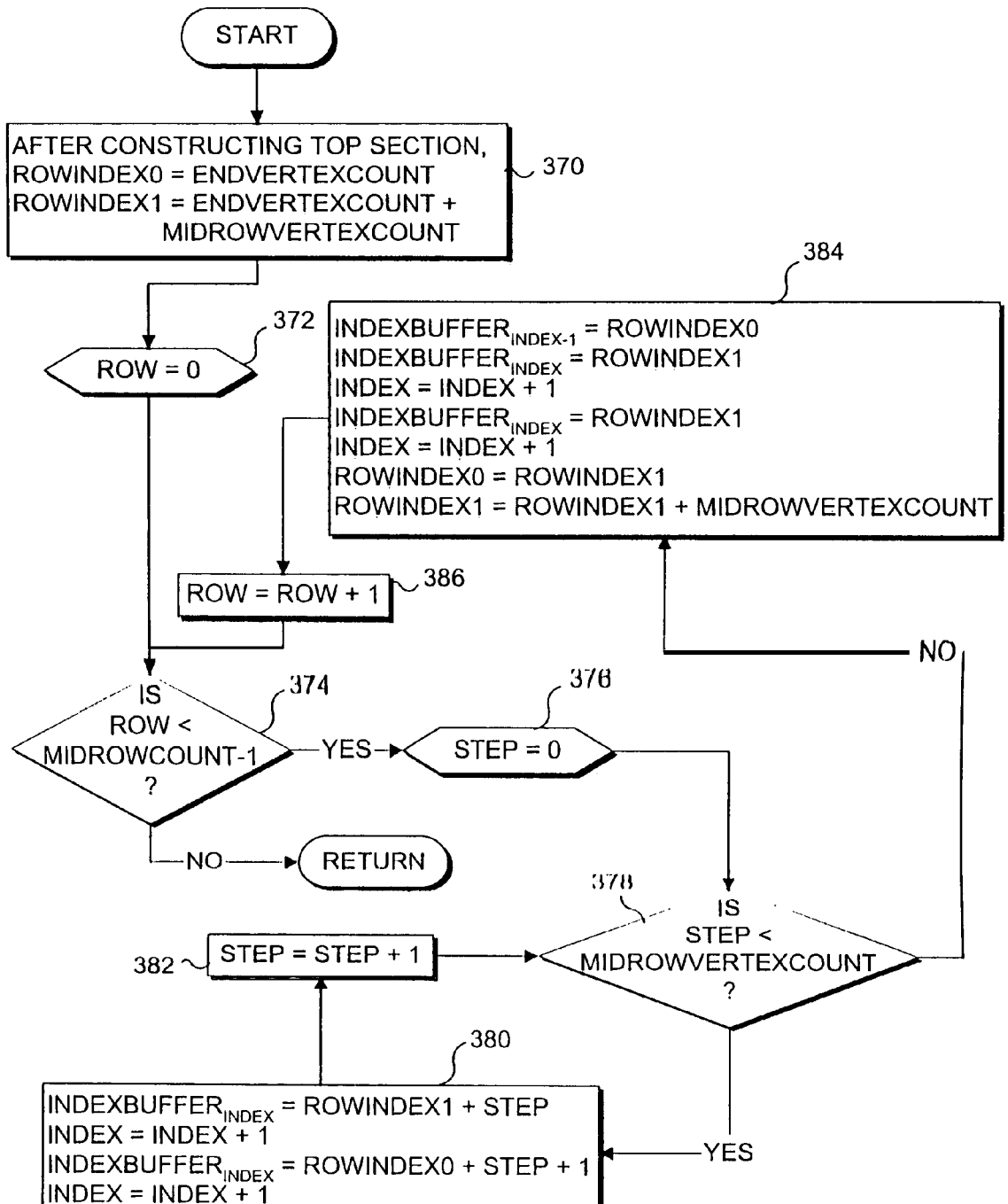
Figure 15:
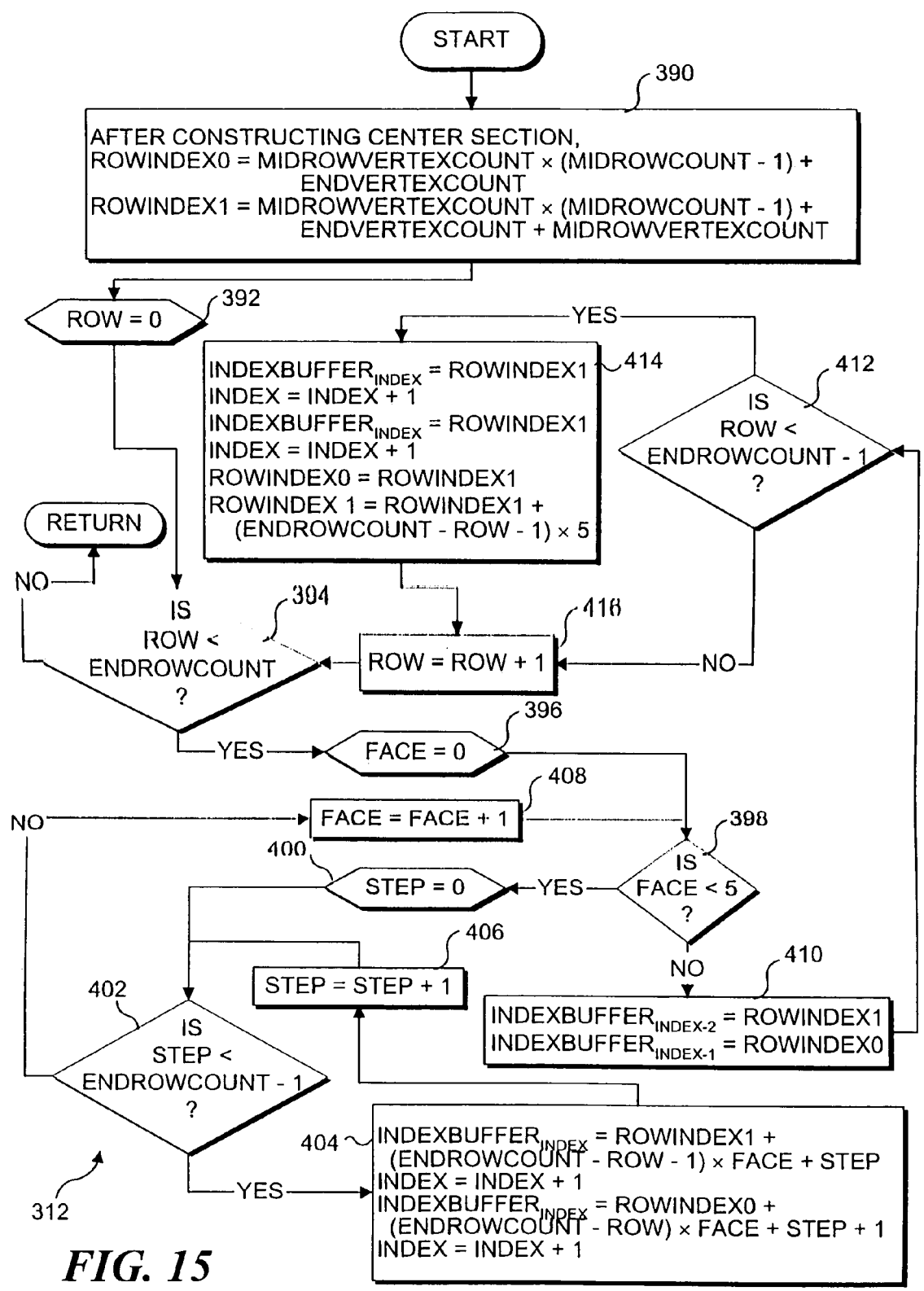
Figure 16:
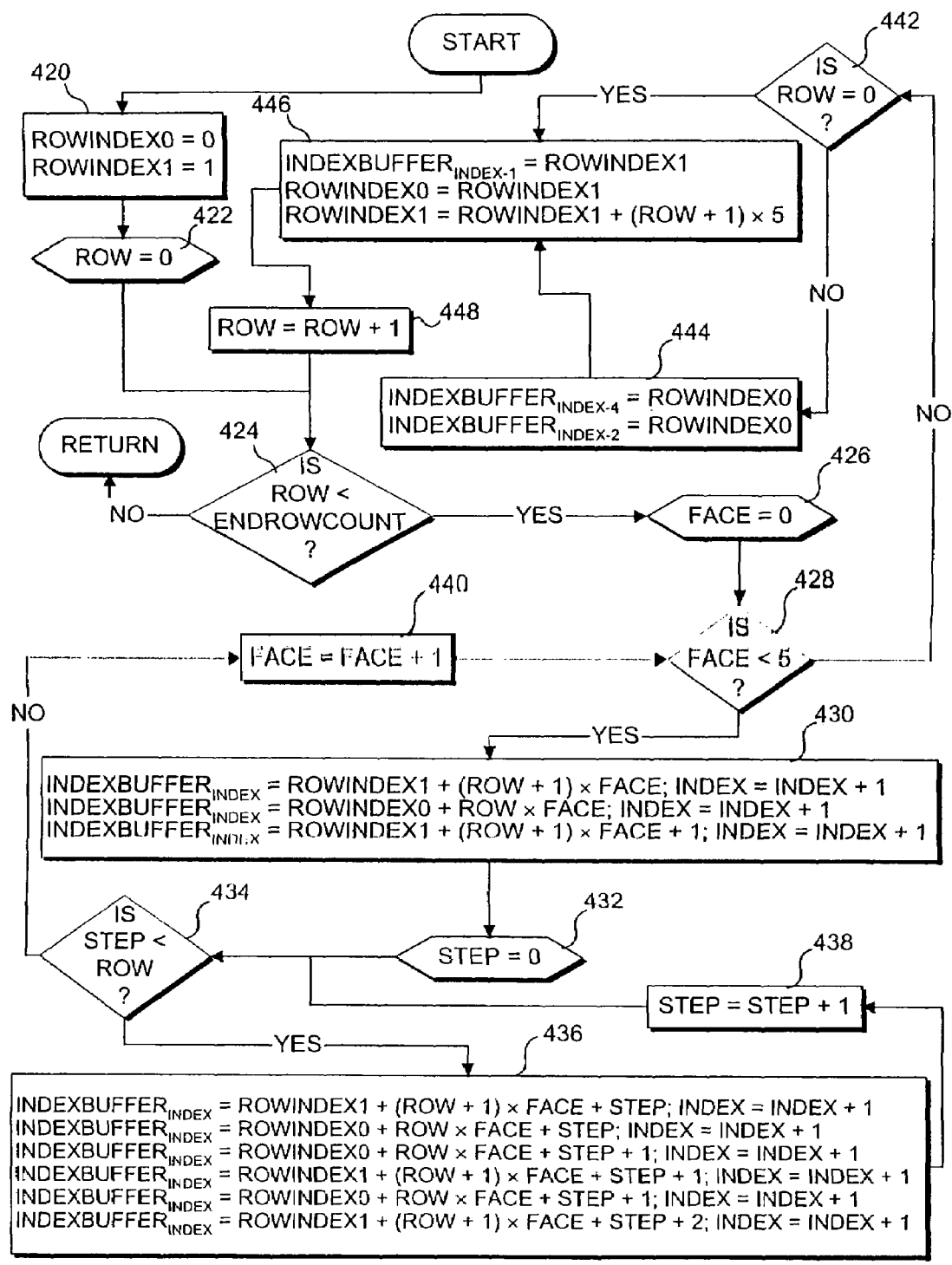
Figure 17:
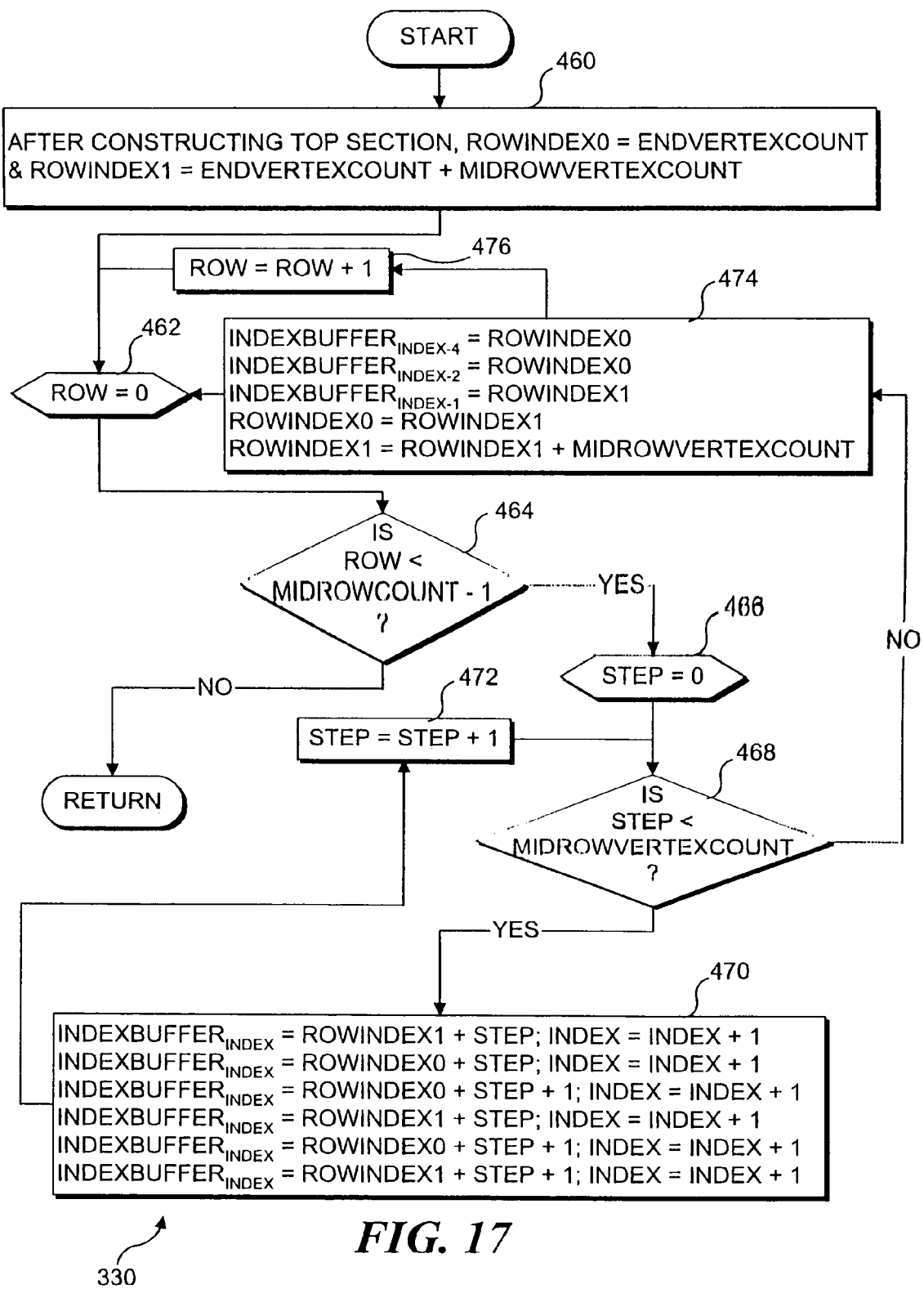
Figure 18:
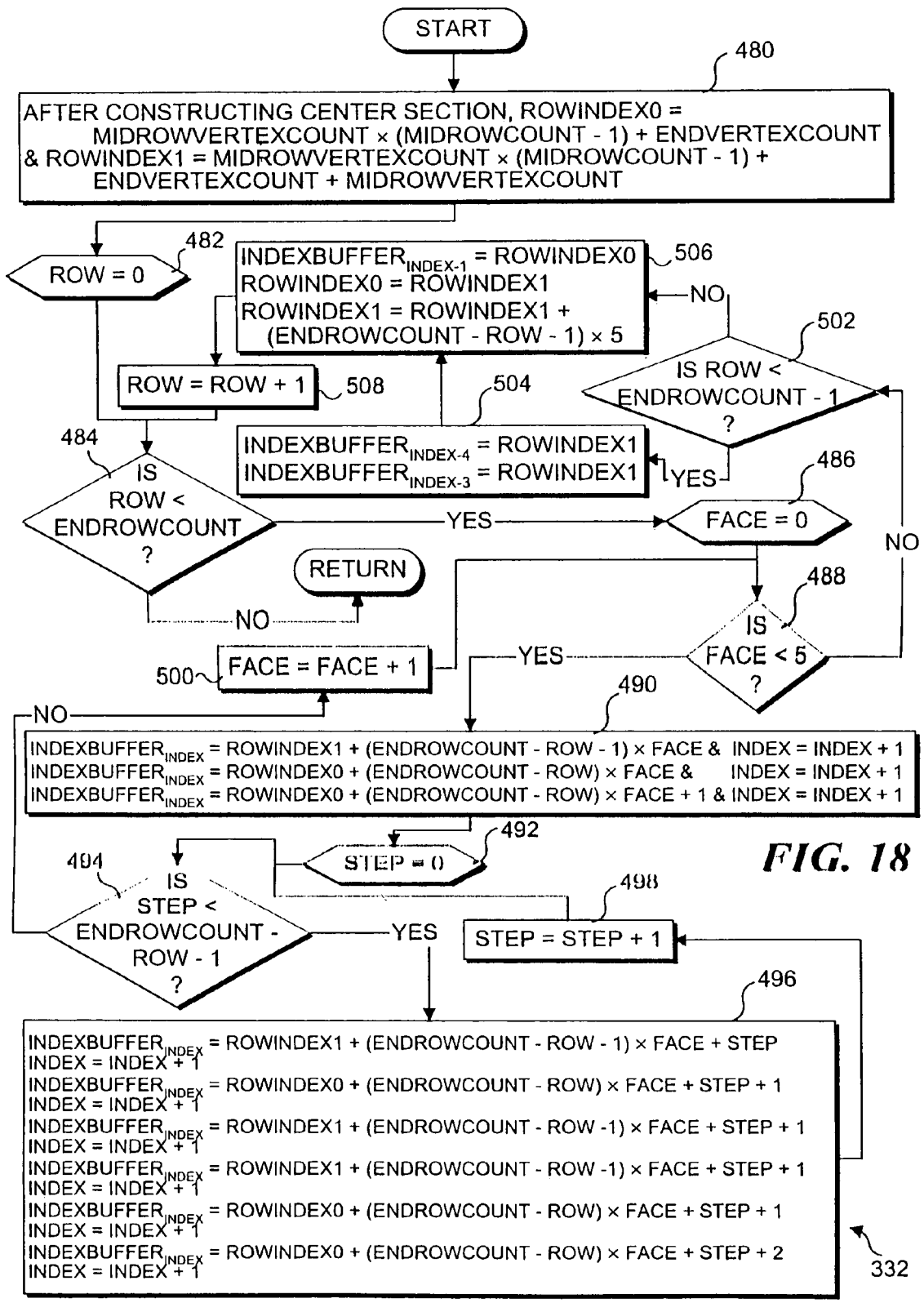

FIGS. 3A, 3B, and 3C are orthographic projections of an icosahedron, showing the four vertices used to define the base geometry of the polyhedron, from the points of view of the negative x, negative y, and positive z axes, respectively (in a left-handed coordinate system);

FIG. 4 illustrates geodesic domes formed from icosahedrons using tessellation orders 1 through 5;

FIG. 5 is a functional block diagram of the system architecture used in the present invention;

FIG. 6 is a top level flowchart showing the overall logical steps carried out in a preferred embodiment of the present invention;

FIG. 7 is a flowchart showing details implemented in constructing vertices of the geodesic dome;

FIG. 8 is a flowchart showing further details for determining the vertices of a top section of the geodesic dome;

FIG. 9 is a flowchart showing the logic for determining the vertices of a central section of the geodesic dome;

FIG. 10 is a flowchart showing the logic for determining the vertices of a bottom section of the geodesic dome;

FIG. 11 is a flowchart showing the steps for constructing a triangle strip to define the geodesic dome;

FIG. 12 is a flowchart showing the steps for constructing triangle lists to define the geodesic dome (as an alternative to the triangle strip);

FIG. 13 is a flowchart that illustrates the details for constructing a triangle strip around the top section of the geodesic dome:

FIG. 14 is a flowchart that illustrates the details for constructing a triangle strip around the center section of the geodesic dome;

FIG. 15 is a flowchart that illustrates the details for constructing a triangle strip around the bottom section of the geodesic dome;

FIG. 16 is a flowchart that illustrates the details for constructing a triangle list around the top section of the geodesic dome:

FIG. 17 is a flowchart that illustrates the details for constructing a triangle list around the center section of the geodesic dome; and FIG. 18 is a flowchart that illustrates the details for constructing a triangle list around the bottom section of the geodesic dome;

DESCRIPTION OF THE PREFERRED EMBODIMENT

PC for Implementing the Present Invention

Figure 1:
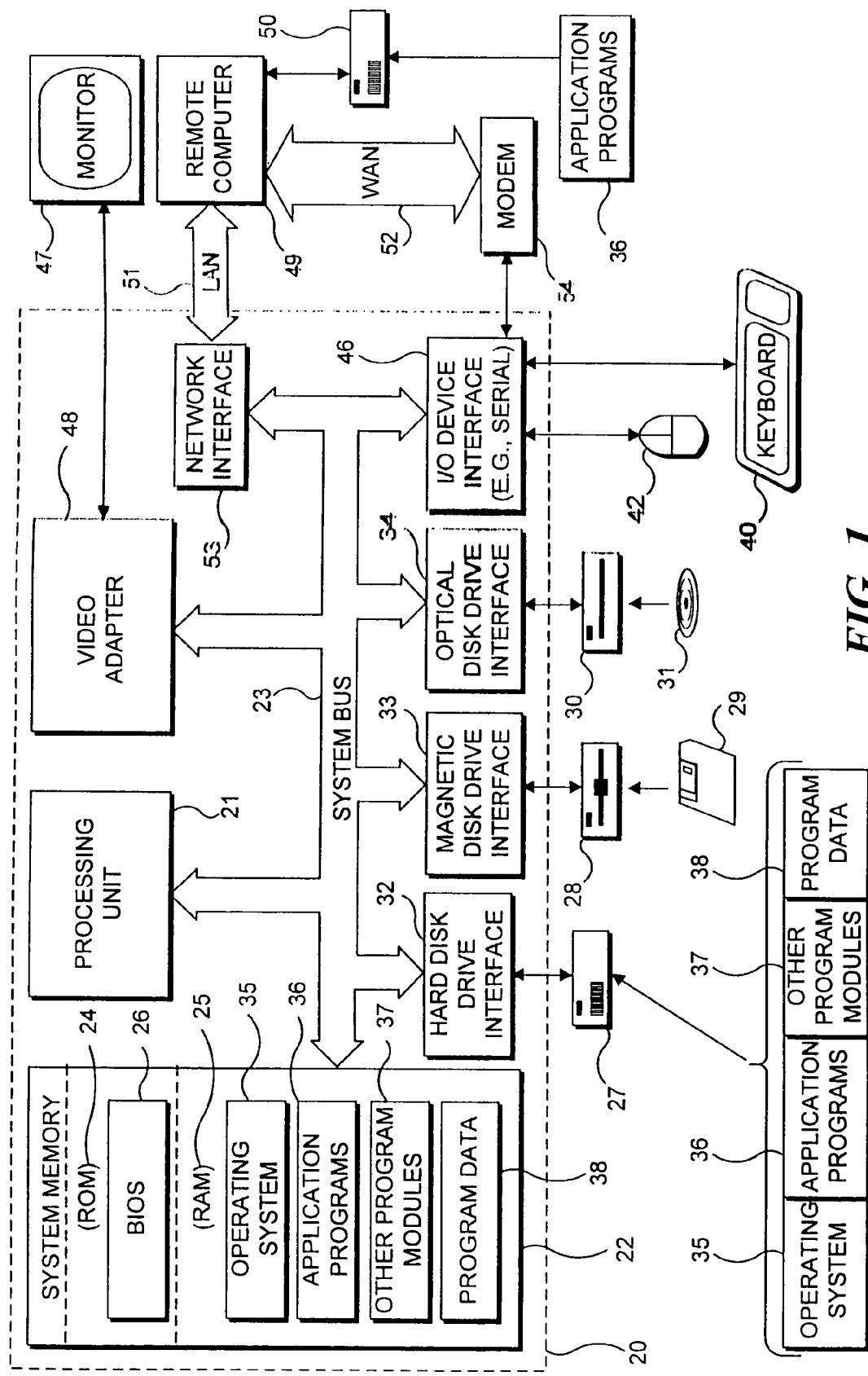
FIG. 1 is a schematic functional block diagram of an exemplary personal computer (PC) that is suitable for executing the present invention.
Figure 2A:
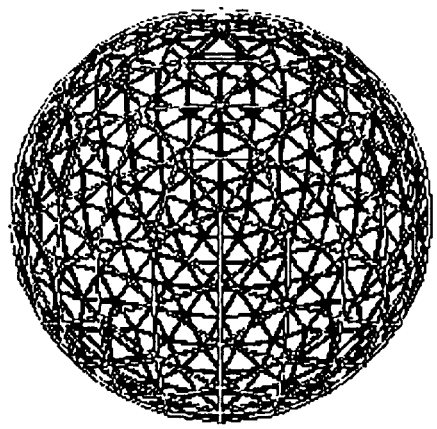
FIG. 2A is an exemplary order 5 (5-frequency) geodesic dome that has been constructed from a subdivided icosahedron (presented in wire frame form)
Figure 2B:
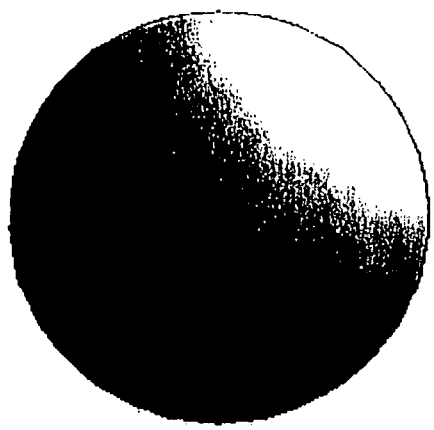
FIG. 2B illustrates the geodesic dome of FIG. 2A rendered with diffuse lighting, using Gouraud shading.

With reference to FIG. 1, an exemplary general purpose computing device useful for implementing the present invention is illustrated in the form of a conventional PC 20. While the present invention was initially developed for use on an electronic game playing system, it will be understood that the invention is generally applicable to almost any type of computing device that might be used to render a sphere or a portion of a sphere in electronic games, or in a virtual environment, or other graphic applications. Examples of such devices include mobile computers, hand held computing devices such as personal data assistants (PDAs), mobile communication devices (e.g., cell phones), and other computing devices that include a display on which a geodesic dome might be generated in accord with the present invention, for rendering a sphere or a portion of a sphere.

The following discussion is intended to provide a brief, general description of a suitable computing environment in which the present invention may be implemented by executing machine instructions, such as program modules, on a PC or other computing platform. Generally, program modules include routines, programs, object, components, data structures, etc. that perform particular tasks or implement particular abstract data types. An embodiment of the present invention is readily implemented on an electronic game system or on a general purpose computing device such as represented by PC 20. PC 20 is provided with a processing unit 21, a system memory 22 and a system bus 23. The system bus couples various system components, including the system memory, to processing unit 21 and may be any of several types of bus structure, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown) and may include a magnetic disk drive 28 for reading from or writing to a removable magnetic disk 29, and an optical disk drive 30 for reading from or writing to a removable optical disk 31, such as a CD-ROM or other optical media, all of which comprise non-volatile memory media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although, the exemplary environment described herein includes a hard disk, removable magnetic disk 29, and removable optical disk 31, it will be appreciated by those skilled in the art that other types of computer readable media, which can store data that are accessible by a computer, such as magnetic cassettes, flash memory cards, DVDs, Bernoulli cartridges, RAMs, ROMs, and the like, may also be used in the exemplary operating environment.

A number of program modules may be stored on the hard disk, magnetic disk 29, optical disk 31, ROM 24 or RAN 25, including an operating system 35, one or more application programs 36, other program modules 37, and program data 38. A user may enter commands and information into PC 20 through input devices such as a keyboard 40 and a pointing device 42. Pointing device 42 may include a mouse, stylus, wireless remote control, or other pointer. Other input devices (not shown) may include a joystick, game pad, wheel pedal, microphone, satellite dish, scanner, digital camera, digital video recorder, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web pages, a simulated or virtual environment such as in the present invention, and/or other information, including visual content of a digital media work that is being played from its original distribution medium, such as a CD-ROM, DVD, or other storage medium. In addition to the monitor, PCs are often coupled to other peripheral output devices (not shown), such as speakers 55 (through a sound card or other audio interface (not shown)), and printers (also not shown).

As indicated above, the invention may be developed and practiced on a single computing device, however, PC 20 may operate in a networked environment using logical connections to one or more remote computers, such as a remote computer 49. Remote computer 49 may be another PC, a server (which is typically generally configured much like PC 20), a router, a network PC, a game console, a peer device, a satellite, or other common network node. Remote computer 49 may include many or all of the elements described above in connection with PC 20. So as not to make FIG. 1 unnecessarily complex, remove computer 49 is shown with only an external memory storage device 50. The logical connections depicted in FIG. 1 include a local area network (LAN) 51 and a wide area network (WAN) 52. Such networking environment are common in offices, enterprise wide computer networks, intranets, and the Internet. When coupled to the Internet, electronic games or other applications in which a virtual environment is employed can be loaded and executed, permitting for example, play of an electronic game or interaction in a virtual environment with other PCs over the network. The present invention can be used to create a sphere or part of a sphere in such games or virtual environment.

When used in a LAN networking environment, PC 20 is typically connected to LAN 51 through a network interface or adapter 53, which may be a wireless network adapter. When used in a WAN networking environment, PC 20 typically includes a modem 54, or other means such as a cable modem, Digital Subscriber Line (DSL) interface, or an Integrated Service Digital Network (ISDN) interface, for establishing communications over WAN 52. One type of WAN commonly used for communication is the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Input Parameters Used in Constructing a Geodesic Dome

While the present invention can be used to construct a geodesic dome using other regular polyhedra, an exemplary embodiment of the present invention preferably employs an icosahedron for this purpose. Given the following disclosure, one of ordinary skill in the art should be able to readily adapt the present invention to constructing a geodesic dome from other polyhedra.

The following input parameters are provided to implement the method, as indicated in blocks 102, 104, and 106 in an overview 100 (FIG. 5):

Radius—The radius of the dome to be constructed.

Vertex_Size—The stride (i.e., the storage size allocated for each vertex in the buffer) of the vertices that will define the dome. The first three floating point values of each vertex will specify the three Cartesian coordinates of the vertex's position. If the stride allows for it, the next three floating point values of each vertex will specify the vertex normal.

Order—The tessellation order of the geodesic dome. (A tessellation order of one generates the base icosahedron itself. FIG. 4 illustrates geodesic domes of orders 1 through 5.)

Form_Strip—Boolean variable indicating the primitive type of the dome (i.e., this variable indicates that the geodesic domes will be defined using a triangle list if the variable is false, and by using a triangle strip if the variable is true).

In a block 108 in FIG. 5, the size of the geodesic dome (i.e., the number of vertices and indices that will be required) is extrapolated. Next a block 110 allocates the necessary memory for the vertex buffer and index buffer that respectively store the vertices and indices of the desired geodesic dome. The calculation used to determine the size of the memory that should be allocated is described below.

A block 116 directs the memory allocation and the Order input variable to either a triangle strip construction block 118, or a triangle list construction block 122, depending upon the value of the Form_Strip variable, as indicated in a block 120. The Radius, V_Size, and Order input variables, along with the vertex buffer memory allocation, are directed to a block 114, which also receives ordered base icosahedron data from a block 112. Blocks 114, 118, and 122 each include three nested loops for forming the top, center, and bottom portions of the geodesic dome. Specifically, block 114, which provides for construction of the vertices, includes nested loops 124, 126, and 128; block 118, which provides for the triangle strips construction, includes nested loops 130, 132, and 134; while block 122, which provides for the triangle lists construction, includes nested loops 136, 138, and 140.

Using the input, the present invention constructs a geodesic dome of the desired radius, tessellation order, and primitive type, and in a block 142, returns the following output data for defining the geodesic dome:

Vertex_Buffer—A vertex buffer that stores the vertices of the geodesic dome.

Vertex_Count—The number of vertices stored in the vertex buffer.

Index_Buffer—An index buffer that stores indices into the vertex buffer, so that the indices and vertices define the triangles forming the geodesic dome.

Index_Count—The number of indices stored in the index buffer.

Triangle_Count—The number of triangle primitives employed to construct the geodesic dome.

The present invention makes use of a number of local variables, as described below. Three constants are also used, and may be pre-computed before the method is actually implemented. The first constant, which is referred to herein as Rotate_One_Fifth_Y, is a 4×4 transformation matrix employed to rotate a 3-D vector about the y axis through an angle of −2π/5 radians (assuming a left-handed coordinate system):

$$\begin{bmatrix} \cos(-2\pi/5) & 0.0 & -\sin(-2\pi/5) & 0.0 \\ 0.0 & 1.0 & 0.0 & 0.0 \\ \sin(-2\pi/5) & 0.0 & \cos(-2\pi/5) & 0.0 \\ 0.0 & 0.0 & 0.0 & 1.0 \end{bmatrix}$$

This matrix evaluates to:

$$\begin{bmatrix} 0.309016994375 & 0.0 & 0.95105651629 & 0.0 \\ 0.0 & 1.0 & 0.0 & 0.0 \\ -0.95105651295 & 0.0 & 0.309016994375 & 0.0 \\ 0.0 & 0.0 & 0.0 & 1.0 \end{bmatrix}$$

The second constant is the set of four vertices that define the base icosahedron from which the geodesic dome is constructed. These constant vertices have the following values:

| | | | |
|---|---|---|---|
| v0 = <0.0 | 1.0 | 0.0> |
| v1 = <$b^2$ | b × a | −a> |
| v2 = <b × a × 2 | $-b^2 + a^2$ | 0.0> |
| v3 = <0.0 | −1.0 | 0.0> | where:

$a=\sqrt{2.0/(5.0-c)}$ $b=\sqrt{2.0/(5.0-c)}$ $c=\sqrt{5.0}$

The constant set of vertices therefore evaluates to:

| | | |
|---|---|---|
| v0 = <0.0 | 1.0 | 0.0> |
| v1 = <0.72360679775 | 0.4472135955 | −0.52573111212> |
| v2 = <0.894427191 | −0.4472135955 | 0.0> |
| v3 = <0.0 | −1.0 | 0.0> |

These constant vertices correspond to four points on an icosahedron whose distances from the central origin of the icosahedron are all equal and are inherently normalized to 1.0. The icosahedron defined by this base geometry is oriented in space in such a way as to take advantage of symmetry along the x axis. The second vertex v1, when reflected through the x axis, corresponds to another point on the icosahedron (this symmetry plays an important role in simplifying the construction of the geodesic dome). FIGS. 3A-3C show these four vertices that define the base geometry of the icosahedron.

The third constant is simply the angle of the sector defined by taking the vectors from the origin of the icosahedron to any two vertices from any one of the 20 triangles forming the icosahedron. This constant, Angle_Face, is obtained by taking the dot product of v0 and v1 and calculating the arc cosine of the result. When evaluated, the following result is obtained:

Angle_Face=1.1071487178 radians

Details of block 108 in FIG. 5, in which the size of the geodesic dome is extrapolated, are as follows. The number of vertex rows and total vertices required for both the top and bottom sections of the dome are determined from the given tessellation order:

End_Row_Count=Order

End_Vertex_Count=(Order−1)×Order/2×5+1

The number of vertex rows and vertices per row needed to form the center section are calculated as:

Mid_Row_Count=Order+1

Mid_Row_Vertex_Count=(Order+1)×Order×5

The total number of vertices used in the construction of the geodesic dome is:

Vertex_Count=Mid_Row_Count×Mid_Row_Vertex_Count+End_Vertex_Count×2

This total is multiplied by the vertex stride that was input and then used to allocate a Vertex_Buffer of a size equal to Vertex_Count×Vertex_Size bytes. This size is used in block 110 to allocate the required memory.

Logical Steps Employed in Constructing a Geodesic Dome

An overview flowchart 150 is illustrated in FIG. 6, showing the steps generally implemented in constructing a geodesic dome, which can be used for rendering a sphere or part of a sphere. The input values used in the process, as described above, are supplied at a step 152, either by a user, or by another software program that is employing the present invention for constructing a geodesic dome. Next, a step 154 calculates the constant Rotate_One_Fifth_Y, which is the first constant discussed above. A step 156 sets forth the second constant, comprising the four vertices that define the base icosahedron used to construct the geodesic dome. Again, the derivation of the values shown in this step has already been discussed above. The third constant, also discussed above, is then defined in a step 158. Step 160 provides for calculating the parameters that are used for extrapolating the size of the geodesic dome and for allocating memory, also as discussed above. A step 162 constructs the vertices of the geodesic dome based on the input parameters. Substantial details are involved in this step, as explained below.

A decision step 164 determines if the value of the Boolean parameter Form_Strip is true and if so, a step 165 carries out a process for constructing a triangle strip. Alternatively, a step 166 carries out the process necessary to construct a triangle list. Further details of each of these processes in steps 165 and 166 are explained below. Once the vertices have been constructed and either the triangle strip or triangle list has been created, a step 168 provides the output defining the geodesic dome in terms of the indicated variables Vertex_Buffer, Index_Buffer, Vertex_Count, Index_Count, and Triangle_Count. The process of constructing the geodesic dome is then complete.

In FIG. 7, details of step 162 are illustrated. A step 170 indicates that this process is provided with each of the inputs, constants, and other parameters that were calculated in step 160 of FIG. 6. Next, a step 172 in FIG. 7 provides that if the Vertex_Size that was input is sufficient to hold six floating point values, then a variable Write_Normals is set equal to true and otherwise is set equal to false. A step 174 then provides an output, calculating a value for the variable Vertex_Count as noted above. Next, a step 176 allocates memory for the Vertex_Buffer as a function of the variable calculated in step 174 and the input variable Vertex_Size. A step 178 sets the Vertex_Buffer write location to the start of the buffer.

After a successful memory allocation, the vertices of the top section of the dome are calculated. In a step 180, the first vertex copied into the buffer is simply v0×Radius. The coordinates for this vertex are copied into the first three floating point values of the vertex buffer (Vertex_Buffer$_{Position}$). If the vertex stride (i.e., the storage spaced allocated for each vertex) that was selected allows for three more floating point values (as determined by the Boolean variable Write_Normals), the vertex normal is stored by copying v0 into the buffer (at Vertex_Buffer$_{Normal}$) for this vertex. Since all vertices of the base icosahedron are at a distance of 1.0 from the center, the values are normalized and also form vectors orthogonal to the icosahedron at each vertex. For subsequent vertices written into the vertex buffer, the Boolean variable Write_Normals is again used to indicate whether the vertex size is sufficient to accommodate a surface normal. Normal to the surface for each vertex are useful in certain graphic applications of the geodesic dome, e.g., for performing lighting calculations, but may not be required for other applications.

A step 182 next provides for constructing the remaining vertices for the top section of the geodesic dome. Details of this step and of steps 184 and 186, which provide for constructing the vertices for the center and bottom sections of the geodesic domes, respectively, are set forth below. In a step 188, the Vertex_Buffer$_{Position}$ is set equal to the product of v3 and the Radius. If Write_Normals is true, then Vertex_Buffer$_{Normal}$ is set to v3. A block 190 indicates produces the Vertex_Buffer as an output.

In FIG. 8, details of step 182 (FIG. 7) are illustrated to show how the remaining vertices for the top section of the geodesic dome are determined. The first vertex of the top section has already been defined. To calculate the remaining vertices of the top section, a vertex, Endpoint0, is initialized in a step 200 to be equal to v0, and an axis vector, Axis_Face is initialized to be perpendicular to the plane of the sector formed by v0 and v1 using the cross product of v0 and v1. (Note that since v0 and v1 are constant values, Axis_Face will also be initialized to a constant and can simply be set to <−0.52573111212, 0.0, −0.72360679775> or <−0.5877852523, 0.0, −0.8090169943745> normalized). In step 200, the axis angle is also used to construct a 4×4 matrix. Rotate_Face, which will rotate a vector around the axis by (Angle_Face/End_Row_Count) radians. This transform will be used to rotate Endpoint0 through the arc of the sector formed by v0 and v1. It is important to note that for all cases that follow wherein a rotation matrix using an arbitrary axis of rotation is built, an optimization may be employed such that the axis of rotation is normalized immediately after it is calculated (i.e. immediately after the cross product operation that is used to calculate the axis). The function later used to initialize the rotation matrix can then assume a normalized axis and does not have to renormalize the given vector every time a matrix is built. In order to simplify the discussion of the present invention, that optimization has not been illustrated in the drawings and is not further described.

After initializing these variables in step 200, the procedure begins the first of three sets of nested loops. The outermost loop iterates over the rows of the top section of the dome. It initializes the variable Row to 1 in a step 202, continues as long as Row is less than End_Row_Count, as determined by a decision step 204, and increments Row after each iteration in a step 212. Upon entering the loop, at a step 206, the procedure multiplies the Endpoint0 vector by the Rotate_Face matrix and sets Endpoint0 to the result to move it down a row along the v0/v1 sector. A second vertex, Endpoint1, is then derived from Endpoint0 by reflecting it through the x axis such that Endpoint1$_x$=Endpoint0$_x$, Endpoint1$_y$=Endpoint0$_y$, and Endpoint1$_z$=Endpoint0$_z$. Also in step 206, another rotation axis, Axis_Sector$_0$, is calculated perpendicular to the plane of the sector formed by the end points through the cross product of Endpoint0 and Endpoint1. As indicated by "x$_{xy}$," a simplified cross product may be employed in this case due to the symmetry between Endpoint0 and Endpoint1, where the z coordinate of the resulting vector can be always set to 0.0 and need not be calculated (since the axis is known to lie in the xy plane). The angle of the sector formed by the two end points is also calculated in step 206, such that Angle_Sector$_0$=arccosine (Endpoint0·Endpoint1)/Row. (Note that "·" is here used to indicate a dot product operation and "×" is used between two vectors to indicate a cross product.) One last variable, Dome_Vertex, is set to be equal to Endpoint0 and will be used to walk along the arc between Endpoint0 and Endpoint1. (Note that Endpoint0 can be used directly instead of a separate Dome_Vertex variable, but this makes the procedure more susceptible to rounding errors stemming from repeated vector-matrix multiplication operations that rotate Dome_Vertex around the dome. Using a separate variable helps preserve the vector against degeneration at the higher tessellation orders).

The next loop nested in the first loop set is used to iterate over the five triangles at the top of the base icosahedron. A step 208 initializes the variable Face to 0, and the next loop continues as long as Face is less than 5, as determined in a decision step 210, and increments Face after each iteration in a step 220. So long as the result of decision step 210 is true, a step 214 performs two operations before the third loop in the set is entered. If the result of decision step 210 is false, the logic continues with s 212. In step 214, the first operation builds a rotation matrix called Rotate_Sector around the Axis_Sector$_0$ axis to rotate a vector by Angle_Sector$_0$ radians. The second operation in step 214 multiplies the Axis_Sector$_0$ vector by the Rotate_One_Fifth_Y matrix and sets Axis_Sector$_0$ to the result, thereby rotating the vector into the next triangular region of the base icosahedron.

The innermost loop of the first set iterates across the arc of the current sector of the icosahedron. It initializes a Step variable to 0 in a step 216, and continues to a step 222, while the variable Step is less than Row, as determined in a decision step 218. The logic increments Step after each iteration of this loop, in a step 226. A negative response to decision step 218 leads to step 220. Inside the innermost loop, at step 222, Dome_Vertex is multiplied by Radius and the result is copied into the Vertex_Buffer at the current write location in the buffer, as indicated by Vertex_Buffer$_{Position}$. Once again, if Write_Normals is true, Dome_Vertex is copied into Vertex_Buffer$_{Normal}$, the surface normal portion of the vertex in the buffer, before advancing the write location in the buffer to the next vertex. Dome_Vertex is then multiplied by the Rotate_Sector matrix and set to the result to advance it along the arc in a step 224. After the conditions for completing the innermost and second loop are met, the three nested loops close, since no operations for computing the vertices in the top section follow after the closing of either of the inner loops.

After the first set of loops has concluded to calculate the vertices for the top section of the geodesic dome, the procedure moves on to calculate the vertices for the center section of the dome, as indicated by the details of step 184, shown in FIG. 7. In a step 230, Endpoint0 is set to be equal to v1, Axis_Face is initialized to be perpendicular to the plane of the sector formed by v1 and v2 (Axis_Face=v1×v2, producing a constant that can be set to <−0.2351141009174, −0.4702282018348, −0.72360679775> or <−0.26286555606, −0.52573111212, −0.8090169943745> normalized), and the Rotate_Face matrix is constructed to rotate a vector about the Axis_Face axis by (Angle_Face/(Mid_Row_Count−1)) radians. The second set of nested loops begins similar to the first set used to calculate the vertices for the top section, with an outer loop to iterate over the rows of the center section of the dome. The Row variable is initialized to 0 in a step 232, and the outer loop continues while Row is less than Mid_Row_Count, as determined by a decision step 234. Row is incremented after each iteration in a step 246. Inside this loop, a step 236 carries out several operations. An array called Step_Count containing two entries is used to track the number of vertices in a row. The first entry will correspond to the even numbered faces comprising the middle of the base icosahedron and the second will correspond to the odd numbered faces. On entering the loop at step 236, Step_Count$_0$ is set to Mid_Row_Count−1−Row, and Step_Count$_1$ is set equal to Row. Endpoint1 is once again derived by reflecting Endpoint0 through the x axis (Endpoint1$_x$=Endpoint0$_x$, Endpoint1$_y$=Endpoint0$_y$, and Endpoint1$_z$=Endpoint0$_z$). This time however, a third end point variable, Endpoint2, is used and is initialized to be the product obtained by multiplying Endpoint0 by the Rotate_One_Fifth_Y matrix. Two axis vectors and two sector angles are calculated from these three end points. Axis_Sector$_0$ is set to the simplified cross product between Endpoint0 and Endpoint1. Again, this cross product operation is simplified in that the result for the z coordinate is set to zero rather than be calculated. But a new variable, Axis_Sector$_1$, must use the full cross product operation to obtain the cross product between Endpoint1 and Endpoint2. Angle_Sector$_0$ is calculated to be equal to arccosine(Endpoint0·Endpoint1)/Step_Count$_0$. The variable Angle_Sector$_1$ is set equal to arccosine (Endpoint1·Endpoint2)/Step_Count$_1$. Dome_Vertex is set to Endpoint0 as before (although, also as before Endpoint0, can be used in place of Dome_Vertex if the rounding errors encountered will be negligible across the entire range of possible tessellation orders given).

The middle nested loop in the second set iterates over the ten triangles contained in the center section of the base icosahedron. This middle loop initializes Face to 0 in a step 238, continues while Face is less than 10, as determined by a decision step 240, and increments Face after each iteration in a step 254. If the result of decision step 240 is negative, the logic continues with a step 242.

In the middle loop, a step 248 carries out several operations. An index variable, Face_Odd is set to 0 if the current value of Face is even, or 1 if the current value of Face is odd (which can be done in a number of ways such as Face_Odd=Face modulus 2, Face_Odd=Face bitwise-AND 1, or by initializing Face_Odd to 0 outside the middle loop and setting Face_Odd=Face_Odd bitwise-XOR 1 after each loop iteration). The Rotate_Sector matrix is initialized to rotate a vector about the Axis_Sector$_{FaceOdd}$ axis by Angle_Sector$_{FaceOdd}$ radians. The Axis_Sector$_{FaceOdd}$ vector is then rotated by multiplying it by the Rotate_One_Fifth_Y matrix and assigning the result to the vector.

As before, the innermost loop in the set iterates across the arc of the current sector. It initializes Step to 0 in a step 250, continues while Step is less than Step_Count$_{FaceOdd}$, as determined by a decision step 252, and increments Step after each iteration in a step 260. If the result in decision step 252 is negative, the logic returns to step 254. The body of the innermost loop is also the same as the body of the innermost loop of the first set. In a step 256, Dome_Vertex is multiplied by Radius and the result is copied into Vertex_Buffer$_{Position}$. Dome_Vertex is copied to Vertex_Buffer$_{Normal}$ if Write_Normals is true. The write location in the buffer is then advanced. Next, in a step 258, Dome_Vertex is multiplied by the Rotate_Sector matrix and set equal to the result. The first and second sets of nested loops do differ in their closure, however. The second set does one operation following the closure of middle loop nest before continuing on with the closure of the outer loop. In this operation, which is carried out in a step 242, the Endpoint0 vector is multiplied by the Rotate_Face matrix and the vector is assigned the result. Step 242 is reached when a negative response to decision step 240 indicates that the middle loop is complete.

In FIG. 10 the third set of nested loops used to compute the vertices for the bottom section of the geodesic dome of step 186 from FIG. 7 also shares similarities with the first set, with the primary exception being that it cannot take advantage of the symmetry of the x axis in the same way. Before entering the loops, a step 270 sets Endpoint0 to v2, calculates Axis_Face as the cross product between v2 and v3 (or since the result is a constant, just sets Axis_Face to <0.0, 0.0, −0.894427191> or <0.0, 0.0, −1.0> normalized), and initializes the Rotate_Face matrix to rotate a vector about the Axis_Face axis by (Angle_Face/End_Row_Count) radians. The outer loop again initializes Row to 1 in a step 272, continues while Row is less than EndRowCount, as determined by a decision step 274. A step 282 increments Row after each iteration. Once inside the outermost loop, several operations are carried out in a step 276. In this step, Endpoint0 is multiplied by the Rotate_Face matrix and is assigned the result. This multiplication is simplified in a similar way to the earlier simplified cross product operations in that the z coordinate needs not be calculated and is instead set to 0.0 (in this case the arc that Endpoint0 is rotated through falls within the xy plane so z is always 0.0). Endpoint1 is calculated by multiplying Endpoint0 by the Rotate_One_Fifth_Y matrix. Axis_Sector$_0$, the rotation axis perpendicular to the plane of the sector formed by the two end points, is calculated to be the cross product (complete not simplified) between Endpoint0 and Endpoint1. Angle_Sector$_0$ is set to arccosine(Endpoint0·Endpoint1)/(End_Row_Count−Row). Dome_Vertex is again set to Endpoint0 although, as in both prior nested loop sets, using Dome_Vertex as a separate variable is not a strict requirement.

The middle loop in the set iterates over the bottom five triangles of the base icosahedron. In a step 278, Face is initialized to 0. In accord with a decision step 280, the loop continues while Face is less than 5. A step 290 increments Face after each loop iteration. Within this loop, a step 284 carries out several operations. The Rotate_Sector matrix is constructed to rotate a vector around the AxisSector$_0$ axis by Angle_Sector$_0$ radians. Axis_Sector$_0$ is then multiplied by the Rotate_One_Fifth_Y matrix and assigned the result.

The innermost loop is processed next. In a step 286, Step is initialized to 0. The innermost loop continues in a decision step 288, while Step is less than (End_Row_Count−Row). Step is incremented after each iteration in a step 296. The body of the innermost loop matches that of the innermost loops of both preceding loop sets. In a step 292, Dome_Vertex is multiplied by Radius, and the result is assigned to the current Vertex_Buffer$_{Position}$ write location. Dome_Vertex is set as the Vertex_Buffer$_{Normal}$ if Write_Normals is true. The write location is then advanced to the next vertex in the buffer. In a step 294, the Dome_Vertex vector is multiplied by the Rotate_Sector matrix and assigned to the result. After all of the loops are compete, the logic returns to step 188 in FIG. 7.

As noted above, in step 188, the last vertex to be written into the vertex buffer is the lowest point on the dome (along the y axis). For this step, v3 is multiplied by Radius, and the result is written to Vertex_Buffer$_{Position}$. If Write_Normals is true, v3 is set as the Vertex_Buffer$_{Normal}$. With this step, all vertices used in the construction of the geodesic dome are now calculated, and the Vertex_Buffer is complete.

Next, the indices that join the vertices of the dome together into triangles must be determined. The form of the index buffer will depend on the value of the given Boolean parameter Form_Strip. If this parameter has been set to true, the indices will define a triangle strip to form the dome. If false, the indices will provide a list of triangles. Each of these cases uses a structurally similar method for constructing the indices of the dome (a set of three nested loops mirroring that used in the formation of the vertices), but the specific operation differ between them. As such the description of these operations will be detailed separately for each case.

The logic for constructing a triangle strip as provided in step 165 (FIG. 6) is illustrated in overview by FIG. 11 and will be used if the Form_Strip parameter is set to true. As shown in step 300, this procedure uses input parameters that include the Order, Mid_Row_Count, End_Row_Count, Mid_Row_Vertex_Count, and End_Vertex_Count. The number of indices and triangles used in dome (i.e., the Output) is calculated to take into account both the arrangement of dome triangles into a strip and the degenerate triangles needed to join together strips between dome sectors and rows. The total number of triangles is calculated in a step 342 as:

Triangle_Count=20×Order$^2$+16×Order−4

The number of indices used in the dome, Index_Count, is also set to Triangle_Count−2 in step 302. The Index_Buffer memory is then allocated in a step 304 to a size equal to Index_Count multiplied by the size of an index (typically a 16 or 32 bit valued). To write values into it, the allocated Index_Buffer is treated as an array and an Index variable is used to track the current write location into the buffer. Initially Index is set to 0 in a step 306. Again, a different portion of the triangle strip is separately computed for the top section in a step 308, the center section in a step 310, and the bottom section in a step 312. However, the triangle strip spirals around the top, central, and bottom sections and includes degenerate triangles to make the triangle strip continuous through all three sections (assuming the entire geodesic dome is being created). The output is then provided as the Index_Buffer in a step 134.

Details of step 308 for computing the triangle strip around the top section of the geodesic dome are provided in FIG. 13. Before entering a first loop of three nested loops, two variables, Row_Index$_0$ and Row_Index$_1$, are declared and initialized in a step 340. These variables will be set to offset values to vertices in the Vertex_Buffer. Row_Index$_0$ will be set to the offset of the first vertex in one row of vertices in the buffer, and Row_Index$_1$ will be set to the offset of the first vertex in the next row. As expected, Row_Index$_0$ is initially set to 0 and Row_Index$_1$ is set to 1.

The outermost loop iterates over the rows of the top section of the dome. The Row variable is initialized to 0 in a step 342, and the loop continues while Row is less than End_Row_Count, as indicated by a decision step 344. The loop increments Row after each iteration, in a step 352. Once inside the loop, the second loop begins immediately. In this loop, Face is initialized to 0 in a step 346. The loop continues while Face is less than 5, as indicated by a decision step 348, and if the result of this decision step is in the negative, the logic proceeds to a step 350. Face is incremented after each iterations, in a step 358.

Once inside the middle loop, the innermost loop begins. This loop initializes Step to 0 in a step 354, continues while Step is less than or equal to Row, as indicated by a decision step 356 and increments Step after each iteration, in a step 362. If the result of decision step 356 is not true, the logic proceeds to step 358. Inside the innermost loop, the Index entry of Index_Buffer is set to (Row_Index$_1$+(Row+1)× Face+Step) in a step 360. In this step, Index is then incremented to advance to the next entry in Index_Buffer, and the Index entry of Index_Buffer is set to (Row_Index$_0$+Raw× Face+Step). Finally, Index is again incremented. After this step, the innermost and middle loops close looping back to step 350 from decision step 348. In step 350, the (Index−1) entry into the Index_Buffer is then set to Row_Index$_0$, to correct the last index set to wrap back around to the start of the vertex row. Two more indices are then added to form degenerate triangles that will move the strip down a row, and both are equal to Row_Index$_1$. For this step, the Index entry of Index_Buffer is set to Row_Index$_1$, Index is incremented, the Index entry of Index_Buffer is again set to Row_Index$_1$, and Index is incremented yet again. As a final task before closing the outermost loop, Row_Index$_0$ and Row_Index$_1$ must be updated. Here, Row_Index$_0$ is set to Row_Index$_1$ and Row_Index$_1$ is incremented by ((Row+1)×5), as the last operation in step 350. The logic then advances to step 352.

FIG. 14 illustrates the steps for constructing the triangle strip around the center portion of the geodesic dome. The Row_Index$_0$ and Row_Index$_1$ variables need not be updated before beginning the second set of nested loops (or the third), because they are correctly initialized coming out of the first loop set. But, just for reference, Row_Index$_0$ is now equal to End_Vertex_Count and Row_Index$_1$ is now equal to End_Vertex_Count+Mid_Row_Vertex_Count, as noted in a step 370. In constructing the center section of the dome, the outermost loop of the second set initializes Row to 0 in a step 372. The outermost loop continues while Row is less than Mid_Row_Count−1, as provided by a decision step 374. A step 386 increments Row after each iteration. The second (and in this case innermost) loop then begins with Step set to 0 in a step 376. In accord with a decision step 378, the second loop continues while Step is less than Mid_ Row_Vertex_Count. If not, the logic advances to a step 384. A step 382 increments Step after each iteration of the second loop. Inside this loop, at a step 380. Index_Buffer at the Index entry is set to Row_Index$_1$+Step and Index is incremented. The Index entry of Index_Buffer is then set to Row_Index$_0$+Step+1 and Index is incremented. The innermost loop closes when the result of decision step 378 leads to step 384.

As in the previous loop set, the last index added must be replaced and two indices for degenerate triangles must be added. These operations are carried out in step 384. In this step, the Index−1 entry of Index_Buffer is set to Row_Index$_0$, the Index entry of Index_Buffer is set to Row_Index$_1$, Index is incremented, the Index entry of Index_Buffer is again set to Row_Index$_1$, and Index is again incremented. Also, before closing the outermost loop at decision step 374, Row_Index$_0$ is set to Row_Index$_1$ and Row_Index$_1$ is incremented by Mid_Row_Vertex_Count in step 384.

The third and final loop set used in constructing the triangle strip in step 312 determines the indices for the bottom section of the dome, as shown in FIG. 15. As with the second loop set, Row_Index$_0$ and Row_Index$_1$ do not need updating, but for reference, Row_Index$_0$ is now equal to Mid_Row_Vertex_Count×(Mid_Row_Count−1)+End_Vertex_Count and Row_Index$_1$ is equal to Mid_Row_Vertex_Count×(Mid_Row_Count−1)+End_Vertex_Count+Mid_Row_Vertex_Count, as shown in a step 390. The outermost of what will be three loops in this set initializes Row to 0 in a step 392. A decision step 394 continues the loop while Row is less than End_Row_Count. A step 416 increments Row after each iteration. The middle loop follows immediately by initializing Face to 0 in a step 396. While Face is less than 5, a decision step 398 continues the middle loop, advancing to a step 410, once the condition is no longer met. A step 408 increments Face after each iteration. The innermost loop then begins by initializing Step to 0 in a step 400. A decision step 402 continues processing the innermost loop while Step is less than or equal to (End_Row_Count−Row−1), and if not, the logic proceeds to step 408. A step 406 increments Step after each iteration of the innermost loop. Within the body of the innermost loop, at a step 404, several operations are completed. Specifically, the Index entry of Index_Buffer is set to Row_Index$_1$+(End_Row_Count−Row−1)×Face+Step, and Index is incremented. The Index entry of Index_Buffer is then set to Row_Index$_0$+(End_Row_Count−Row)×Face+Step+1, and Index is incremented again in step 404.

Once the innermost and middle loops close when the condition in decision step 398 is no longer met, two index values previously written into the Index_Buffer need to be "fixed up" to wrap them around to the start of the row. This operation is carried out in step 410, wherein the Index−2 entry of Index_Buffer is set to Row_Index$_1$ and be Index−1 entry of Index_Buffer is set to Row_Index$_0$. Degenerate triangle indices are then added and the row index variables are updated as usual, but in this case, only if the procedure has not reached the last strip row (since degenerates are not needed after the final row). So if Row is less than (End_Row_Count−1) in decision step 412, in a step 414, the Index entry of Index_Buffer will be set to Row_Index$_1$, Index will be incremented, the Index entry of Index_Buffer will again be set to Row_Index$_1$, Index will again be incremented, Row_Index$_0$ will be set to Row_Index$_1$, and Row_Index$_1$ will be incremented by (End_Row_Count−1)×5. Otherwise, the logic continues with step 416. After the outermost loop closes with a negative response in decision step 394, the geodesic dome construction is complete.

If the Form_Strip parameter is set to false, a similar set of operations as that used to form the strip index list will take place. The primary differences between the procedure employed to form the triangle strip and that used to form the triangle list is that additional indices are supplied to provide three indices per triangle in the latter case, and no additional indices are added for the now unnecessary degenerate triangles. Details of step 166 that define the overview of the process for constructing the triangle lists are shown in FIG. 12. Again, as shown in a step 320, the input to the process includes the Order. Mid_Row_Count, End_Row_Count, Mid_Row_Vertex_Count, and End_Vertex_Count. In a step 322, the Triangle_Count is calculated to be 20×Order$^2$ and Index_Count is (Triangle_Count×3). The Index_Buffer is allocated in memory in a step 324, as in the triangle strip case, only with the new allocation size. As before, the Index variable will be used to track the write location offset and is initialized to 0 in a step 326. The Row_Index$_0$ and Row_Index$_1$ variables will also serve the same purpose in forming the triangle list. Three sets of nested loops are again executed to construct the triangle list for the top section, center section, and bottom section of the geodesic dome, as indicated respectively in steps 328, 330, and 332. The result is an output that include the Index_Buffer, as shown in a step 334.

Details of step 328 for constructing the triangle list for the top section of the dome are shown in FIG. 16. Preceding the first set of nested loops, Row_Index$_0$ is set to 0 and Row_Index$_1$ is set to 1 in a step 420. The outermost loop begins by initializing Row to 0 in a step 422, and the outermost loop continues while Row is less than End_Row_Count, as determined in a decision step 424. A step 448 increments Row after each iteration of the outermost loop.

The middle loop then begins, initializing Face to 0 in a step 426. This loop continues, as determined in a decision step 428, while Face is less than 5, and if not, the process proceeds to a decision step 442. In a step 440, Face is incremented after each iteration of the middle loop. Within this loop, at a step 430, three indices are added to the Index_Buffer before the innermost loop begins, and after each index is added, the Index variable is incremented. The first to be added is Row_Index$_1$+(Row+1)×Face, followed by Row_Index$_0$÷Row×Face, and then Row_Index$_1$+(Row+1)×Face−1.

The innermost loop begins at a step 432, which initializes Step to 0 and continues while Step is less than Row, as determined in a decision step 434. A step 438 increment Step after each iteration of the innermost loop. Six indices per iteration are added to Index_Buffer within the body of this loop, at a step 436. In step 436, using Index to reference the current "write" entry and incrementing Index after each addition, the following indices are added in the order listed: Row_Index$_1$+(Row+1)×Face÷Step+1, Row_Index$_0$÷Row×Face+Step, Row_Index$_0$+Row×Face+Step÷1, Row_Index$_1$+(Row÷1)×Face+Step+1, Row_Index$_0$+Row×Face+Step÷1, and finally Row_Index$_1$+(Row+1)×Face+Step+2. Note that Row×Face+Step and/or (Row÷1)×Face+Step may be calculated once, stored in temporary variables, and then referenced in the index calculations.

After closing both the innermost and middle loops with a negative response at decision step 428, two of the previous index values written are "fixed up" for rows other than the first to wrap them around. If Row is not equal to 0 in decision step 442, both the Index−4 and Index−2 entries of Index_Buffer are set to Row_Index$_0$. A third index value is then fixed up in a step 446 (no matter what the value of Row), so that the Index−1 entry of Index_Buffer is set to Row_Index$_1$. As a final task before closing the outermost loop, the row index values are also updated in step 446; Row_Index$_0$ is set to Row_Index$_1$, and Row_Index$_1$ is incremented by (Row+1)×5.

The second set of nested loops used to construct the triangle list for the center section of the geodesic dome consists of only two loops, as shown for step 330 in FIG. 17. Before entering the outer of these two loops, Row_Index$_0$ will be equal to End_Vertex_Count and Row_Index$_1$ will be equal to End_Vertex_Count+Mid_Row_Vertex_Count, as shown in a step 460, but as with the triangle strip construction, neither needs to be explicitly set. The outer loop begins by initializing Row to 0 in a step 462. A decision step 464 loop continues the outer loop while Row is less than Mid_Row_Count−1. A step 476 increments Row after each iteration of the outer loop. The inner loop follows, initializing Step to 0 in a step 466. The inner loop continues, as provided by a decision step 468, while Step is less than Mid_Row_Vertex_Count, and if not, the logic proceeds to a step 474. A step 472 increments Step after each iteration of the inner loop.

As was the case with the first loop set to construct the triangle list for the top section, the body of the inner loop adds six indices per iteration to Index_Buffer (incrementing Index after each addition). In a step 470, these indices are calculated to be: Row_Index$_1$+Step, Row_Index$_0$+Step, Row_Index$_0$+Step+1, Row_Index$_1$+Step.Row_Index$_0$+Step÷1, and Row_Index$_1$+Step+1.

After closing the inner loop, when the condition in decision step 468 is no longer met, three indices are fixed up. In step 474, the Index−4 and Index−2 entries of Index_Buffer are both set to Row_Index$_0$, and the Index−1 entry is set to Row_Index$_1$. Also in step 474, Row_Index$_0$ is set to Row_Index$_1$, and Row_Index$_1$ is incremented by Mid_Row_Vertex_Count. The outer loop closes when decision step 464 returns a negative response.

Finally, the details of step 332 for constructing the triangle list for the bottom section of the geodesic dome are illustrated in FIG. 18. Emerging from the second set of loops, a step 480 notes that Row_Index$_0$ is equal to Mid_Row_Vertex_Count×(Mid_Row_Count−1)+End_Vertex_Count, and Row_Index$_1$ is equal to Mid_Row_Vertex_Count×(Mid_Row_Count−1)+End_Vertex_Count÷Mid_Row_Vertex_Count (again, this step is merely a reference as to the values of Row_Index$_1$ and Row_Index$_2$ and should not be taken as an operation to be performed). For the bottom section of the dome, the outermost of the final loop set opens in a step 482 by initializing Row to 0. A decision step 484 ensures that processing in the outermost loop continues while Row is less than End_Row_Count. A step 508 increments Row after each iteration of the outermost loop.

The middle loop follows in a step 486, which initializes Face to 0. A decisions step 488 continues processing the middle loop while Face is less than 5. A step 500 increments Face after each iteration of the middle loop. Within the loop, at a step 490, the following three indices are added to the Index_Buffer (incrementing Index after each addition): Row_Index$_1$−(End_Row_Count−Row−1)×Face, Row_Index$_0$÷(End_Row_Count−Row)×Face, and Row_Index$_0$+(End_Row_Count−Row)×Face+1.

The innermost loop then begins at a step 492, initializing Step to 0. A decision step 494 continues processing in the innermost loop while Step is less than End_Row_Count−Row−1. Step is incremented in a step 498 after each iteration of this innermost loop. In a step 496 of the innermost loop, six indices per iteration are added to Index_Buffer (again incrementing Index after each value is added): Row_Index$_1$+End_Row_Count−Row−1)×Face+Step, Row_Index$_0$+(End_Row_Count−Row)×Face+Step−1, Row_Index$_1$+(End_Row_Count−Row−1)×Face−Step÷1, Row_Index$_1$÷(End_Row_Count−Row−1)×Face+Step+1, Row_Index$_0$+(End_Row_Count−Row)×Face+Step+1, and Row_Index$_0$+(End_Row_Count−Row)×Face+Step+2. As before these calculations can use temporary variables to hold the intermediate results so they won't have to be evaluated multiple times. The innermost and middle loops then close when the response in decision step 488 is negative, leading to step 502, followed by fix-ups to some of the indices. Decision step 502 determines if Row is less than End_Row_Count−1, and if so, in a step 504, the Index−4 and Index−3 entries in the Index_Buffer are set to Row_Index$_1$. Next, in a step 506, the Index−1 entry of Index_Buffer is set to Row_Index$_0$ (whether on the last row or not), and finally, Row_Index$_0$ is set to Row_Index$_1$ and Row_Index$_1$ is incremented by (End_Row_Count−Row−1)×5. With that, the outer loop closes with a negative response to decision step 484, concluding the formation of the triangle list.

Whether the procedure formed a triangle strip or a triangle list, when it has finished calculating the indices defining the arrangement of dome triangles, the present invention returns the constructed geodesic dome's Vertex_Buffer, Index_Buffer, Vertex_Count, Index_Count and Triangle_Count. These output parameters fully define the constructed geodesic dome, as indicated in step 168 of FIG. 6. If only a portion of the geodesic dome is required for a specific graphic application, the process used to construct the vertices and indices can then be limited to produce the vertices and indices of triangles comprising the portion of the geodesic dome desired. In this case, a further input would indicate the portion of the geodesic dome to be generated e.g., the top half, for use in rendering a hemisphere.

Depending upon the application of the present invention, the geodesic dome that has been constructed can serve various purposes. Most commonly, the geodesic dome, or a portion of it, will be used to render a sphere (or portion of a sphere) in a graphic environment, such as an electronic game or virtual environment. The present invention enables a sphere or portion thereof to be efficiently rendered in real time, and using very little more memory resources than are required to store the vertices and indices of the geodesic dome at the order desired.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method implemented by a computing device for generating at least a part of a geodesic dome for use in a graphic environment, comprising the steps of:
   (a) defining a base geometry of a polyhedron, said polyhedron having a plurality of faces, each of which is a polygon, said base geometry including a plurality of vertices of the faces, at selected locations on the polyhedron;
   (b) based upon the plurality of vertices at the selected locations and using a plurality of transformation matrices, generating vertices and indices for a plurality of triangles comprising the faces of the geodesic dome, by successively processing the successive faces of the polyhedron, in successive different sections of the polyhedron, wherein the vertices and indices of the plurality of triangles are generated only in a single pass without any further subdivision of the polyhedron;

(c) preparing a triangle construct using said vertices and indices that are generated;

(d) storing the vertices and indices for the triangle construct as geometric data that define the at least the part of the geodesic dome; and (e) using the stored vertices and indices, generated in the single pass, to generate a display in a graphic environment.

2. The method of claim 1, wherein the step of defining the base geometry includes the step of selecting the vertices so as to form a plurality of edges disposed at a unity distance from a center of the polyhedron, two of said vertices being disposed at opposite ends of the polyhedron.

3. The method of claim 1, wherein the step of generating the vertices includes the step of multiplying current coordinates for a dome vertex by a radial dimension desired for the geodesic dome, at each of a plurality of different positions of the dome vertex, the dome vertex being determined as a function of the base geometry of the polyhedron and the plurality of transformation matrices.

4. The method of claim 1, wherein the different sections of the polyhedron include a top section, a middle section, and a bottom section.

5. The method of claim 1, further comprising the step of allocating a vertex buffer in a memory to store the vertices and an index buffer in the memory to store the indices.

6. The method of claim 5, wherein the step of allocating comprises the step of determining the number of vertices and indices required for constructing the at least the part of the geodesic dome to a desired tessellation order.

7. The method of claim 1, further comprising the step of enabling input of a plurality of parameters to control generating the at least the part of the geodesic dome, said parameters including a radius of the geodesic dome, and a tessellation order of the geodesic dome.

8. The method of claim 7, wherein the step of enabling input also enables input of a vertex size defining a stride of the vertices that define the at least the part of the geodesic dome.

9. The method of claim 7, wherein the step of enabling input also enables input of another parameter that determines how much of the geodesic dome is to be generated.

10. The method of claim 7, wherein the triangle construct comprises one of:

(a) a triangle strip including vertices and indices for adjacent triangles comprising the geodesic dome, said triangle strip spiraling around each section of the polyhedron and including degenerate triangles used to produce the triangle strip; and (b) a triangle list of vertices and indices for adjacent triangles in each different section of the geodesic dome.

11. The method of claim 10, wherein the step of enabling input also enables an election to be made to use either the triangle strip or the triangle list for the triangle construct.

12. The method of claim 1, further comprising the step of computing a plurality of constants for use in generating the at least the part of the geodesic dome, wherein a first constant comprises a transformation matrix, said transformation matrix being employed to rotate a three dimensional vector about a selected axis through a predefined angle, a second constant comprises the base geometry of the polyhedron, and a third constant comprises a dot product of any two vertices of any polygon comprising a face of the polyhedron.

13. The method of claim 1, wherein the polyhedron is an icosahedron, and wherein the step of defining the base geometry comprises the steps of defining four vertices, including first and fourth vertices that are disposed at opposite ends of the icosahedron, and second and third vertices that are disposed at other predefined corners of the icosahedron, intermediate the ends thereof, each vertex of said four vertices being disposed at equal distances from a central origin of the icosahedron.

14. The method of claim 1, further comprising the step of determining surface normals for each triangle vertex of the plurality of the triangles that define the at least the part of the geometric dome.

15. A machine readable medium that stores machine instructions, that when executed on a computing machine, cause the execution of steps comprising:

(a) defining a base geometry of a polyhedron, said polyhedron having a plurality of faces, each of which is a polygon, said base geometry including a plurality of vertices of the faces, at selected locations on the polyhedron;

(b) based upon the plurality of vertices at the selected locations and using a plurality of transformation matrices, generating vertices and indices for a plurality of triangles comprising the faces of the geodesic dome, by successively processing the successive faces of the polyhedron, in successive different sections of the polyhedron, wherein the vertices and indices of the plurality of triangles are generated only in a single pass, without any further subdivision of the polyhedron;

(c) preparing a triangle construct using said vertices and indices that are generated;

(d) storing the vertices and indices for the triangle construct as geometric data that define the at least the part of the geodesic dome; and (e) using the stored vertices and indices, generated in the single pass, to generate a display in a graphic environment.

16. A system for generating at least a part of a geodesic dome for use in a graphic environment, comprising:

(a) a memory in which machine instructions are stored and for storing geometric data defining the at least the part of the geodesic dome; and (b) a processor coupled to the memory, said processor executing the machine instructions to carry out a plurality of functions, including:

(i) defining a base geometry of a polyhedron, said polyhedron having a plurality of faces, each of which is a polygon, said base geometry including a plurality of vertices of the faces, at selected locations on the polyhedron;

(ii) based upon the plurality of vertices at the selected locations and using a plurality of transformation matrices, generating vertices and indices for a plurality of triangles comprising the geodesic dome, by successively processing successive faces of the polyhedron, in successive different sections of the polyhedron, wherein the vertices and indices of the plurality of triangles are generated only in a single pass without any further subdivision of the polyhedron;

(iii) preparing a triangle construct using said vertices and indices that are generated; and (iv) storing the vertices and indices for the triangle construct in the memory as geometric data that define the at least the part of the geodesic dome for use in the graphic environment for display or other purposes.

17. The system of claim 16, wherein the machine instructions further cause the processor to define the base geometry including the step of selecting the vertices so as to form a plurality of edges disposed at a unity distance from a center of the polyhedron, two of said vertices being disposed at opposite ends of the polyhedron.

18. The system of claim 16, wherein the machine instructions further cause the processor to multiply current coordinates for a dome vertex by a radial dimension desired for the geodesic dome, at each of a plurality of different positions of the dome vertex, the dome vertex being determined as a function of the base geometry of the polyhedron and the plurality of transformation matrices.

19. The system of claim 16, wherein the different sections of the polyhedron include a top section, a middle section, and a bottom section.

20. The system of claim 16, wherein the machine instructions further cause the processor to allocate in the memory a vertex buffer to store the vertices and an index buffer to store the indices.

21. The system of claim 20, wherein the machine instructions further cause the processor to determine the number of vertices and indices required for constructing the at least the part of the geodesic dome to a desired tessellation order.

22. The system of claim 16, wherein the machine instructions further cause the processor to enable input of a plurality of parameters that the processor uses to control generating the at least the part of the geodesic dome, said parameters including a radius of the geodesic dome, and a tessellation order of the geodesic dome.

23. The system of claim 22, wherein the machine instructions further cause the processor to enable input of a vertex size defining a stride of the vertices that define the at least the part of the geodesic dome.

24. The system of claim 22, wherein the machine instructions further cause the processor to enable input of another parameter that determines how much of the geodesic dome is to be generated.

25. The system of claim 22, wherein the triangle construct comprises one of:
(a) a triangle strip including vertices and indices for adjacent triangles comprising the geodesic dome, said triangle strip spiraling around each section of the polyhedron and including degenerate triangles used to produce the triangle strip; and
(b) a triangle list of vertices and indices for adjacent triangles in each different section of the geodesic dome.

26. The system of claim 25, wherein the machine instructions further cause the processor to enable determining whether to use either the triangle strip or the triangle list, for the triangle construct.

27. The system of claim 16, wherein the machine instructions further cause the processor to compute a plurality of constants for use in generating the at least the part of the geodesic dome, wherein a first constant comprises a transformation matrix, said transformation matrix being employed to rotate a three dimensional vector about a selected axis through a predefined angle, a second constant comprises the base geometry of the polyhedron, and a third constant comprises a dot product of any two vertices of any polygon on a face of the polyhedron.

28. The system of claim 16, wherein the polyhedron is an icosahedron, and wherein the machine instructions further cause the processor to define the base geometry using four vertices, including first and fourth vertices that are disposed at opposite ends of the icosahedron, and second and third vertices that are disposed at other predefined corners of the icosahedron, intermediate the ends thereof, each vertex of said four vertices being disposed at equal distances from a central origin of the icosahedron.

29. The system of claim 16, further comprising the step of determining surface normals for each triangle vertex of the plurality of triangles that define the at least the part of the geometric dome.

* * * * *